United States Patent
Huang et al.

(10) Patent No.: US 11,824,980 B2
(45) Date of Patent: *Nov. 21, 2023

(54) ENHANCED SECURITY FOR MULTI-LINK WIRELESS OPERATIONS

(71) Applicant: Intel Corporation, Santa Clara, CA (US)

(72) Inventors: Po-Kai Huang, San Jose, CA (US); Cheng Chen, Portland, OR (US); Ido Ouzieli, Tel Aviv (IL); Avner Epstein, Givatayim (IL); Danny Alexander, Neve Efraim Monoson (IL); Ofer Schreiber, Kiryat Ono (IL); Arik Klein, Givaat Shmuel (IL); Daniel Bravo, Portland, OR (US); Laurent Cariou, Portland, OR (US); Ofer Hareuveni, Haifa (IL); Ehud Reshef, Qiryat Tivon (IL); Nir Balaban, Kfar Netter (IL)

(73) Assignee: Intel Corporation, Santa Clara, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 17/004,985

(22) Filed: Aug. 27, 2020

(65) Prior Publication Data

US 2021/0050999 A1   Feb. 18, 2021

Related U.S. Application Data

(60) Provisional application No. 62/892,109, filed on Aug. 27, 2019, provisional application No. 62/895,723, filed on Sep. 4, 2019.

(51) Int. Cl.
H04L 9/08     (2006.01)
H04W 76/15   (2018.01)
(Continued)

(52) U.S. Cl.
CPC .......... *H04L 9/088* (2013.01); *H04L 61/5069* (2022.05); *H04W 76/15* (2018.02); *H04L 2101/622* (2022.05)

(58) Field of Classification Search
CPC ............... H04L 9/088; H04L 61/5069; H04L 2101/622; H04L 63/104; H04L 2209/80;
(Continued)

(56) References Cited

U.S. PATENT DOCUMENTS

| 2015/0039909 A1* | 2/2015 | Tseng | G06F 21/80 713/193 |
| 2015/0296374 A1* | 10/2015 | Moreillon | H04N 7/1675 380/270 |

(Continued)

*Primary Examiner* — Mohammad W Reza
(74) *Attorney, Agent, or Firm* — Eversheds Sutherland (US) LLP

(57) ABSTRACT

This disclosure describes systems, methods, and devices related to security for multi-link operations. A multi-link device (MLD) may establish a first communication link between a first device of the MLD and a first device of a second MLD, and a second communication link between a second device of the MLD and a second device of the second MLD. The MLD may generate a group-addressed message. The MLD may protect the group-addressed message using a first key or a first integrity key. The MLD may protect the group-addressed message using a second key or a second integrity key. The MLD may send, using the first communication link, the group-addressed message protected using the first key or the first integrity key, and may send, using the second communication link, the group-addressed message protected using the second key or the second integrity key.

20 Claims, 20 Drawing Sheets

(51) Int. Cl.
*H04L 61/5069* (2022.01)
*H04L 101/622* (2022.01)

(58) Field of Classification Search
CPC ....... H04L 9/0833; H04L 9/0894; H04L 9/14; H04L 9/3242; H04W 76/15; H04W 12/041; H04W 12/106
See application file for complete search history.

(56) References Cited

U.S. PATENT DOCUMENTS

2016/0197897 A1* 7/2016 Lester .................... H04L 9/3247
 713/168
2023/0016360 A1* 1/2023 Fletcher ............... G06Q 20/065

* cited by examiner

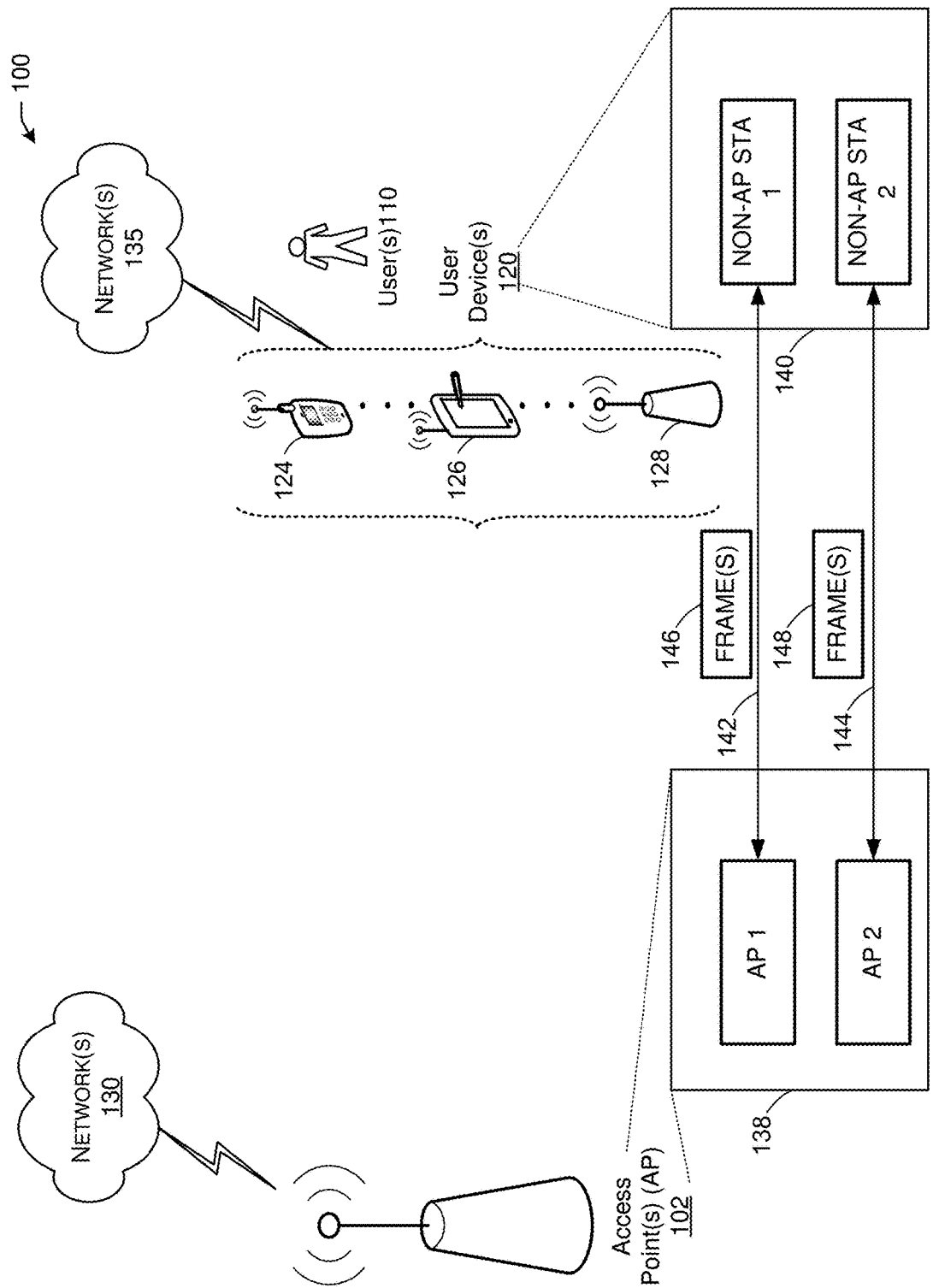

| QC FIELD | A4 FIELD | AAD LENGTH (OCTETS) |
|---|---|---|
| ABSENT | ABSENT | 22 |
| PRESENT | ABSENT | 24 |
| PRESENT | PRESENT | 28 |
| PRESENT | PRESENT | 30 |

…

ENHANCED SECURITY FOR MULTI-LINK WIRELESS OPERATIONS

CROSS-REFERENCE TO RELATED APPLICATIONS

This application is related to and claims priority to U.S. Provisional Patent Application No. 62/892,109, filed Aug. 27, 2019, and to U.S. Provisional Patent Application No. 62/895,723, filed Sep. 4, 2019, which are hereby incorporated herein by reference in their entirety.

TECHNICAL FIELD

This disclosure generally relates to systems and methods for wireless communications and, more particularly, to security for multi-link wireless operations.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIG. 1 is a network diagram illustrating an example network environment for multi-link operations, in accordance with one or more example embodiments of the present disclosure.

DETAILED DESCRIPTION

Figure 2A:
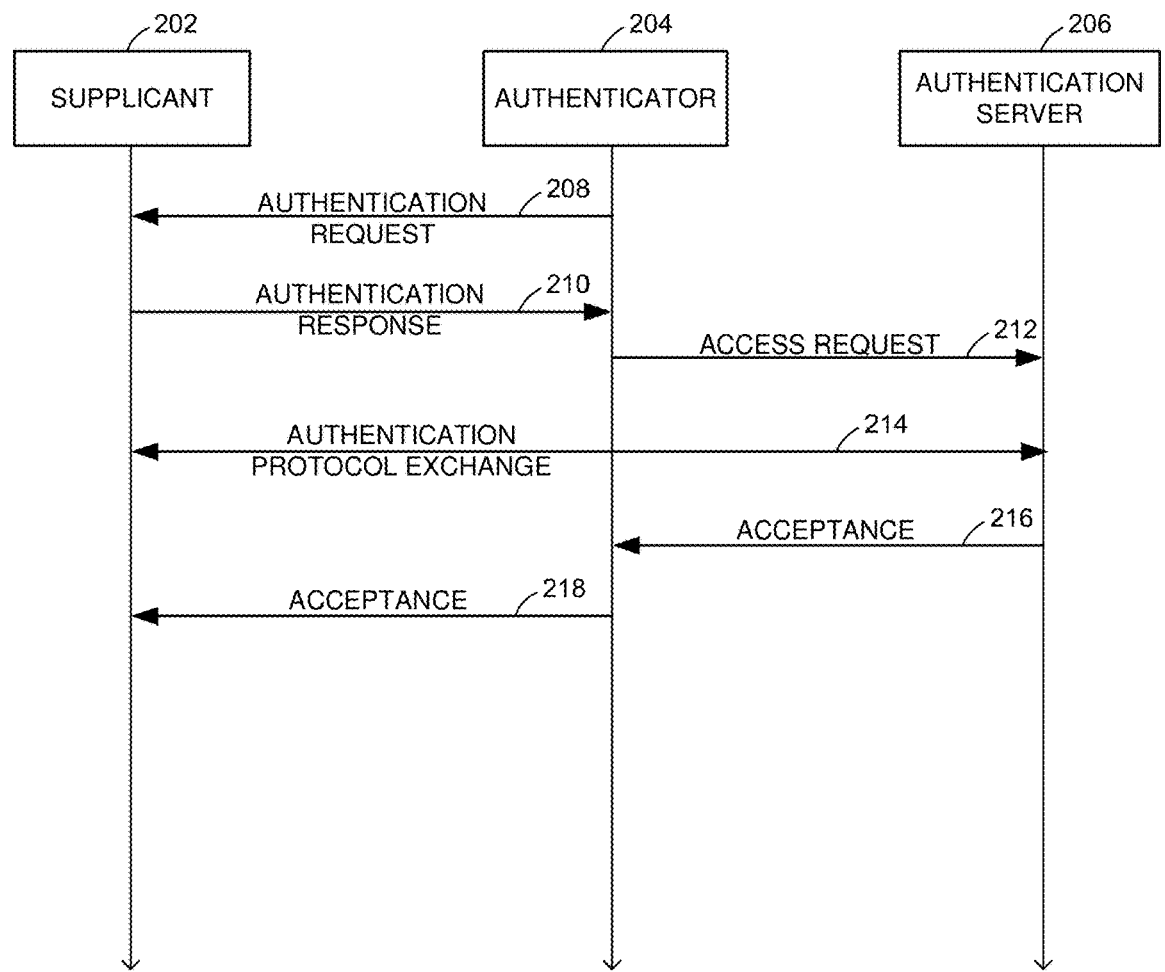
FIG. 2A illustrates an example authentication process, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

The IEEE 802.11 technical standards for wireless communication provide security and authentication using a variety of techniques, such as robust security network association (RSNA) between two station devices (STAs). Some detailed procedures are described in sections of the IEEE 802.11 technical standards defining authentication key management (AKM) operations with AS (e.g., in a situation without password) and AKM operations with a password or pre-shared key (PSK) (e.g., in a situation with password).

Various types of keys are used in IEEE 802.11 communications. For example, a pairwise transient key (PTK) may be a unique key used to encrypt traffic between devices (e.g., a STA and an access point—AP). Group-addressed transmissions may use other keys, such as a group temporal key (GTK), an integrity group temporal key (IGTK), and a beacon integrity group temporal key (BIGTK). The different types of keys may require certain conditions, as explained further herein, and the conditions may not be met in certain multi-link operations unless enhancements are provided.

A STA may refer to a logical entity that is a singly addressable instance of a medium access control (MAC) and physical layer (PHY) interface to the wireless medium (WM). A communication link (or just "link") in the context of an IEEE 802.11 medium access control (MAC) entity, may refer to a physical path consisting of exactly one traversal of the wireless medium (WM) that is usable to transfer MAC service data units (MSDUs) between two STAs.

In multi-link communications, a multi-link device (MLD), also referred to as a multi-link logical entity (MLLE), may refer to a device that has more than one affiliated STA and that has a medium access control (MAC) layer (e.g., of a communication layer stack) service access point (SAP) to a logical link control (LLC), which may include a MAC data service. An AP MLD (A MLD) may refer to an AP device, where each STA affiliated with the STA MLD is an AP. A non-AP ML device (non-AP MLD) maybe an A MLD, where each STA affiliated with the MLD is a non-AP STA. A MLD may be considered a logical/virtual entity with multiple STAs (e.g., AP STAs or non-AP STAs), and each STA concurrently may use separate communication links with corresponding STAs of another MLD. In this manner, a MLD may communicate over multiple communication links concurrently without having to drop one communication link to allow for establishing another communication link. The AP or non-AP entities of MLDs may use the same or different MAC addresses, which may affect the defined use of different keys in the IEEE 802.11 technical standards. For example, whether to use a same key across multiple links between MLDs may depend on the type of key being used, MAC addresses of MLD STAs, and other factors as described herein.

For example, a MLD may have a MAC address that singly identifies a MLD management entity. MAC addresses may be used in ML setup between a non-AP MLD and an A MLD. When a PTK is used, either the same PTK or different PTKs may be used across the multiple links. When the same PTK is used across multiple links, there is a requirement that the nonce value needs to be unique for each encrypted message. For example, a message sent across multiple links between MLDs the nonce value needs to be different in each message. However, because nonce is generated using a transmitter address, a transmitting MLD with the same transmitter address for different MLD STAs may result in the same nonce. Therefore, to satisfy the nonce requirement of PTK, enhancements may be needed.

When a same key is used for IGTK and BIGTK modes, it may be possible that the message integrity code (MIC) of two links is exactly the same for a group-addressed management frame or beacon frame, and the frames as sent using one link may be replayed in another link, resulting in security problems as discussed further herein.

For example, when a same key across multiple links is used for GTK, it could be possible that the encryption of the links is exactly the same for a group-addressed frame sent across the links, and a security attack may exploit this situation. In particular, when group-addressed messages with different packet numbers are transmitted across each of multiple links between MLDs, the same group-addressed messages may need to be received by MLDs in each link (e.g., for legacy devices). When two AP elements of an A MLD have the same MAC address, the basic service set identifier (BSSID) of each AP element may be the same, and an A1 field of each message, representing the broadcast address may be the same. When cypher block chaining message authentication code protocol (CCMP) is used for message encryption, the additional authentication data (AAD) fields and the nonce values of the messages in each link may be the same, respectively. When at attacker receives one of the messages sent using a first link, the attacker therefore may retransmit the same message in another link to be received by any STA element of a MLD using the link, resulting in a denial of service attack, messages not being received by the MLDs, and a replay counter for relay detection being updated (e.g., to 7).

When a same key is used for IGTK and BIGTK, it may be possible that the MIC of two links is the same for any group-addressed management frame or beacon frame that uses the links, and the frames may be replayed (e.g., resent) in another link by an attacker. Therefore, using different GTKs, IGTKs, and/or BIGTKs may result in reduced likelihood of an attack. In addition, using different GTKs, IGTKs, and/or BIGTKs may simplify implementation requirements for an A MLD to synchronize key management for use of different keys in different communication links, and may allow an A MLD to refresh keys in other communication links and reduce the frequency with which to refresh a group key in any communication link. In particular, refreshing a group key may be an inefficient process.

For a MLD to use different encryption methods and keys to transmit messages across multiple concurrently active links established with another MLD, the two MLDs may need to establish and manage the different encryption methods and keys for the different links that are used concurrently by a same physical device (e.g., a MLD). For example, concurrent links used by a MLD do not require the tearing down or disconnection of one link to allow another link to be active. In particular, MLDs may have multiple encryption methods and keys that may be available for use in different links that are concurrently active. In this manner, the use of different encryption methods and keys across multiple links used by MLDs is different than the use of different encryption methods and keys used across different links when only one link at a time may be active for a physical device (e.g., a legacy non-MLD device).

There is therefore a need to enhance security for multi-link operations for a variety of key types in wireless communications.

Multi-AP operations may be used in extremely high throughput (EHT) communications defined by the IEEE 802.11 standards. PHY and MAC level coordination among multiple APs may allow for improved performance, including coordinated techniques such as coordinated scheduling, coordinated beamforming, and coordinated orthogonal frequency-division multiple access (OFDMA), and joint techniques such as joint processing, distributed multiple-input multiple-output (MIMO) etc. However, some multi-AP techniques require a unified multi-AP framework to support corresponding coordination operations.

Multi-AP group security focuses on a method to distribute the key for authenticating and verifying the multi-AP trigger frames sent within a group, which are used to initiate different multi-AP coordination functions, including coordinated beamforming, coordinated OFDMA, joint processing etc. If there is no group security to protect the multi-AP Trigger frames, an illegitimate AP may attack a multi-AP network by sending fake multi-AP trigger frames to any AP in the group arbitrarily without any authentication, and therefore affect or even control the operations of the triggered AP.

Multi-AP group policy focuses on a mechanism for a coordinator AP to determine and set the operation rules within a multi-AP group, such that the group policy is configured to enable all APs in the same group to achieve a common coordination objective according to specific use cases and application scenarios.

However, solutions for Multi-AP group security may be needed. For multi-AP group policy, some proposals may define which device(s) should be able to send multi-AP trigger frames within a multi-AP group. Multiple modes are considered as possible options.

In one option, only the coordinator AP is able to send a multi-AP trigger frame. In another option, any AP that accesses a wireless medium and obtains a transmission opportunity (TXOP) may be able to send the multi-AP trigger frame.

However, currently there is no known concept of defining the policy to flexibly adjust the operation rules based on specific use cases and application scenarios.

Example embodiments of the present disclosure relate to systems, methods, and devices for enhanced security for multi-link operations in wireless communications.

In one or more embodiments, to address the security issue of using a same PTK in messages sent across multiple links, a different nonce for the messages may be used by using different MAC addresses of MLD elements. For example, when the MAC addresses of AP elements of an A MLD are different addresses (e.g., different for the APs on the same MLD), the non-AP elements on an associated MLD also may be different. In particular, when the MLD and A MLD establish the communication links, the MLD and A MLD may establish the separate MAC addresses of the AP elements of the A MLD that are linked to the non-AP elements of the MLD. When the AP elements of the A MLD have different MAC addresses from one another, the non-AP elements of the MLD may be set to different MAC addresses from one another. In this manner, the different transmitter MAC addresses of the MLD elements when the MLD transmits packets with a PTK may result in different nonce values across the multiple links between MLDs. The MAC address of the affiliated AP elements within an AP MLD may be different from each other unless the affiliated APs cannot perform simultaneous TX/RX operation (e.g., due to near band in-device interference), in which case the MAC address properties are to be determined. A MLD that supports multiple links may announce whether it supports transmission on one link concurrent with reception on the other link for each pair of links.

In one or more embodiments, to address the security issue of using a same PTK in messages sent across multiple links, the AAD construction may be altered. For example, when the MAC addresses of two STA elements of an MLD are different, and the MAC addresses of the STA elements are the same, the AAD construction of a unicast transmission across a link may be modified by replacing the MAC addresses of the two STA elements of a MLD with MAC addresses of an upper layer of the communication stack of the MLD.

In one or more embodiments, to address the security issue of using a group-addressed frame, (e.g., a GTK, BIGTK, or IGTK key), various approaches are proposed to mandate that the encryption method in different links for the same message will be different. The encryption method may include using different GTK, BIGTK, or IGTK, different MAC addresses, and the details to deliver different GTK, IGTK, BIGTK. The encryption method of a same group-addressed message transmitted across different links may not be the same method for both links.

In one or more embodiments, for transmissions using GTK, one option to allow for different encryption methods across the different links is to use different GTKs for the different links. A four-way handshake process between MLDs may be used to deliver the respective GTK in different links. A group key handshake may be used to deliver the respective GTK in different links. A new multi-link GTK key data encapsulation (KDE) may be generated with the following fields: a key identifier field in the GTK KDE, the transmitter Tx defined in the GTK KDE, the link identifier identifying the link, and/or the GTK of the identified link (e.g., link identified by the link identifier). A link without a multi-link GTK KDE may use a default GTK of the four-way handshake. The multi-link GTK KDE may be included in a third message of the four-way handshake. When using GTK security association (GTKSA), the link identifier may be included to differentiate different GTK-SAs, and the authenticator device's address may be the MAC address of the A MLD for the upper layer. Different links may use the same cipher suite to indicate the robust security network element (RSNE) of the four-way handshake. Different cipher suites across links may be used along with different GTKs. For example, a group data cipher suite field and link identifier may be included in the third message of the four-way handshake to indicate the cipher suite used in the link identified by the link identifier. The group data cipher suite field and link identifier may be included in a multi-link element, for example. In another embodiment, the STAs of an A MLD may use different respective MAC addresses. In another embodiment, when the MAC addresses of the STAs are the same, a different GTK may be used. Otherwise, the same GTK may be used. A multi-link GTK KDE may be constructed as described above.

In one or more embodiments, for transmissions using IGTK, one option to allow for different encryption methods across the different links is to use different IGTKs for the different links. A four-way handshake process between MLDs may be used to deliver the respective IGTK in different links. A group key handshake may be used to deliver the respective IGTK in different links. A new multi-link IGTK KDE may be generated with the following fields: a key identifier field in the IGTK KDE, the link identifier identifying the link, the IGTK of the identified link (e.g., link identified by the link identifier), and/or an IGTK packet number (IPN) for the link. The multi-link IGTK KDE may be included in a third message of the four-way handshake. When using a group key handshake, the IGTK KDE may be included in a first message of the group key handshake. When using IGTK security association (IGTKSA), the link identifier may be included to differentiate different IGTK-SAs, and the authenticator device's address may be the MAC address of the A MLD for the upper layer. Different links may use the same cipher suite to indicate the robust security network element (RSNE) of the four-way handshake. Different cipher suites across links may be used along with different IGTKs. For example, a group data cipher suite field and link identifier may be included in the third message of the four-way handshake to indicate the cipher suite used in the link identified by the link identifier. The group data cipher suite field and link identifier may be included in a multi-link element, for example. In another embodiment, the STAs of an A MLD may use different respective MAC addresses. In another embodiment, when the MAC addresses of the STAs are the same, a different IGTK may be used. Otherwise, the same IGTK may be used. A multi-link BIGTK KDE may be constructed as described above.

In one or more embodiments, for transmissions using BIGTK, one option to allow for different encryption methods across the different links is to use different BIGTK for the different links. A four-way handshake process between MLDs may be used to deliver the respective BIGTK in different links. A group key handshake may be used to deliver the respective BIGTK in different links. A new multi-link BIGTK KDE may be generated with the following fields: a key identifier field in the BIGTK KDE, the link identifier identifying the link, the BIGTK of the identified link (e.g., link identified by the link identifier), and/or an BIGTK packet number (IPN) for the link. The multi-link BIGTK KDE may be included in a third message of the four-way handshake. When using a group key handshake, the BIGTK KDE may be included in a first message of the group key handshake. When using BIGTK security association (BIGTKSA), the link identifier may be included to differentiate different BIGTKSAs, and the authenticator device's address may be the MAC address of the A MLD for the upper layer. Different links may use the same cipher suite to indicate the robust security network element (RSNE) of the four-way handshake. Different cipher suites across links may be used along with different BIGTKs. For example, a group data cipher suite field and link identifier may be included in the third message of the four-way handshake to indicate the cipher suite used in the link identified by the link identifier. The group data cipher suite field and link identifier may be included in a multi-link element, for example. In another embodiment, the STAs of an A MLD may use different respective MAC addresses. In another embodiment, when the MAC addresses of the STAs are the same, a different BIGTK may be used. Otherwise, the same BIGTK may be used. A multi-link BIGTK KDE may be constructed as described above.

In one embodiment, a multi-AP group security and policy system may facilitate a general and unified framework for EHT multi-AP group, such that the framework can be applied to different scenarios to perform different coordination functions. Specifically, two critical aspects, multi-AP group security and multi-AP group policy, together with its corresponding mechanisms and protocols, are proposed. Some of the advantages of the proposal framework are as follows.

The proposed multi-AP group formation and operation protocol is capable of unifying various multi-AP coordination functions into a single framework. It is applicable to different multi-AP use cases and application scenarios.

The proposed multi-AP group security solution enables the authentication and verification of multi-AP trigger frames. Therefore, the multi-AP group is protected from outside attack in the form of fake multi-AP trigger frames.

The proposed multi-AP policy enables the coordinator AP to determine a set of operation rules within the multi-AP group, which all the APs have to comply with. The multi-AP policy ensures that all APs in the network can coordinate with each other under some pre-defined rules in order to achieve a common goal. The policy may be flexibly adjusted to enable the multi-AP group to appropriately accommodate different use cases and application scenarios.

In one or more embodiments, a multi-AP group security and policy system may facilitate to first characterize the definitions that will be used in the proposed framework of an EHT Multi-AP group.

Coordinator AP: The AP that executes the management and control functions in an EHT Multi-AP group. There is a single Coordinator AP in one EHT Multi-AP group. The Coordinator AP is capable of communicating with any other AP in the same EHT Multi-AP group.

Coordinated AP: The AP that is not a Coordinator AP in an EHT Multi-AP group. The Coordinated AP is required to comply with the management and control commands sent by the Coordinator AP.

Master AP: The AP that sends the Multi-AP Trigger frame and initiates specific coordination function within an EHT group, such as coordinated OFDMA, coordinated BF, joint processing etc. The Master AP is typically the TXOP holder, and can be either the Coordinator AP or the Coordinated AP.

Slave AP: The AP that is triggered by a Master AP and follows the triggered operation in a TXOP. The Slave AP is typically not the TXOP holder, and can be either the Coordinator AP or the Coordinated AP.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of multi-link operation follow up, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 8:
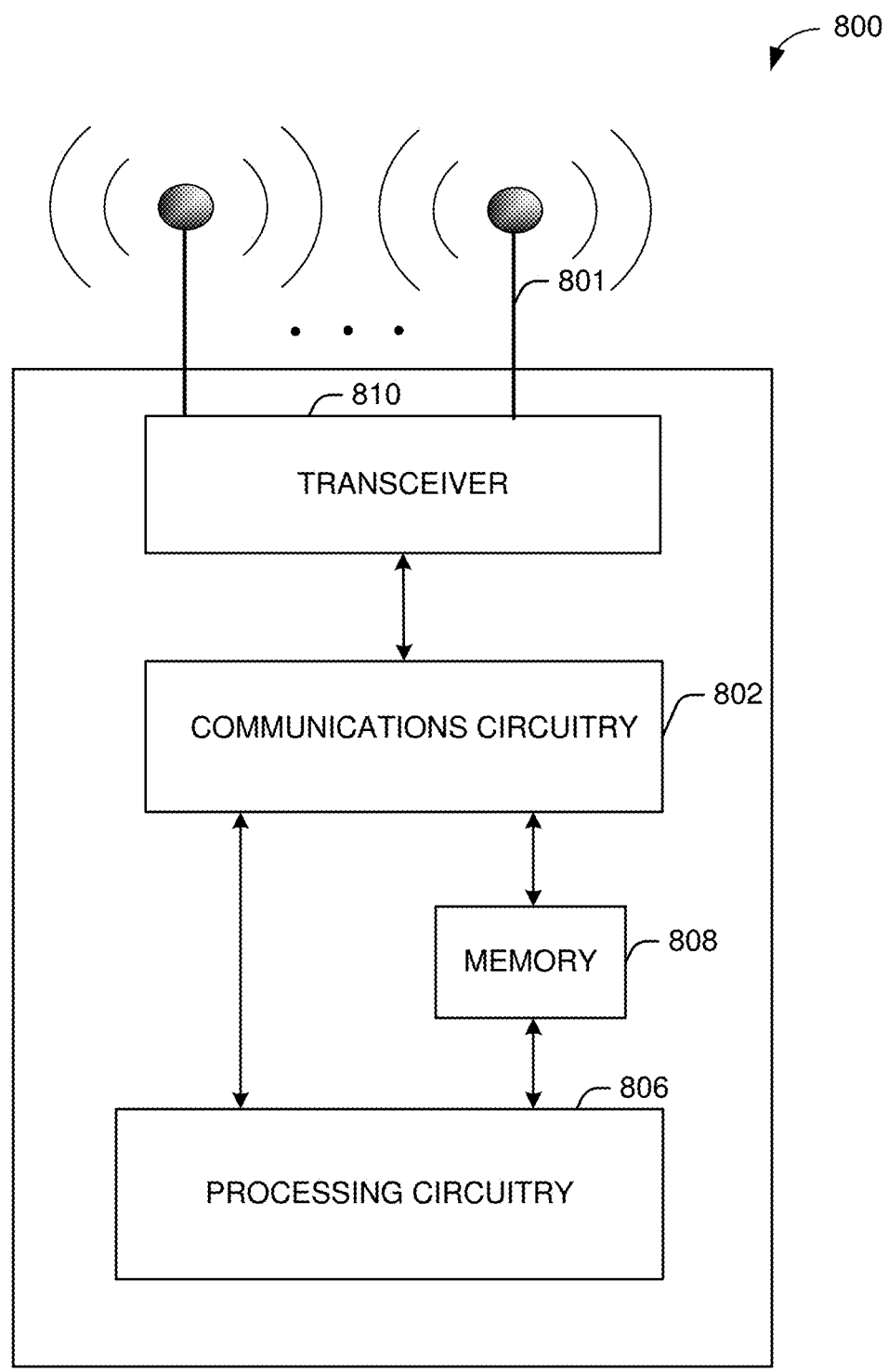
FIG. 8 illustrates a functional diagram of an exemplary communication station that may be suitable for use as a user device, in accordance with one or more example embodiments of the present disclosure.
Figure 9:
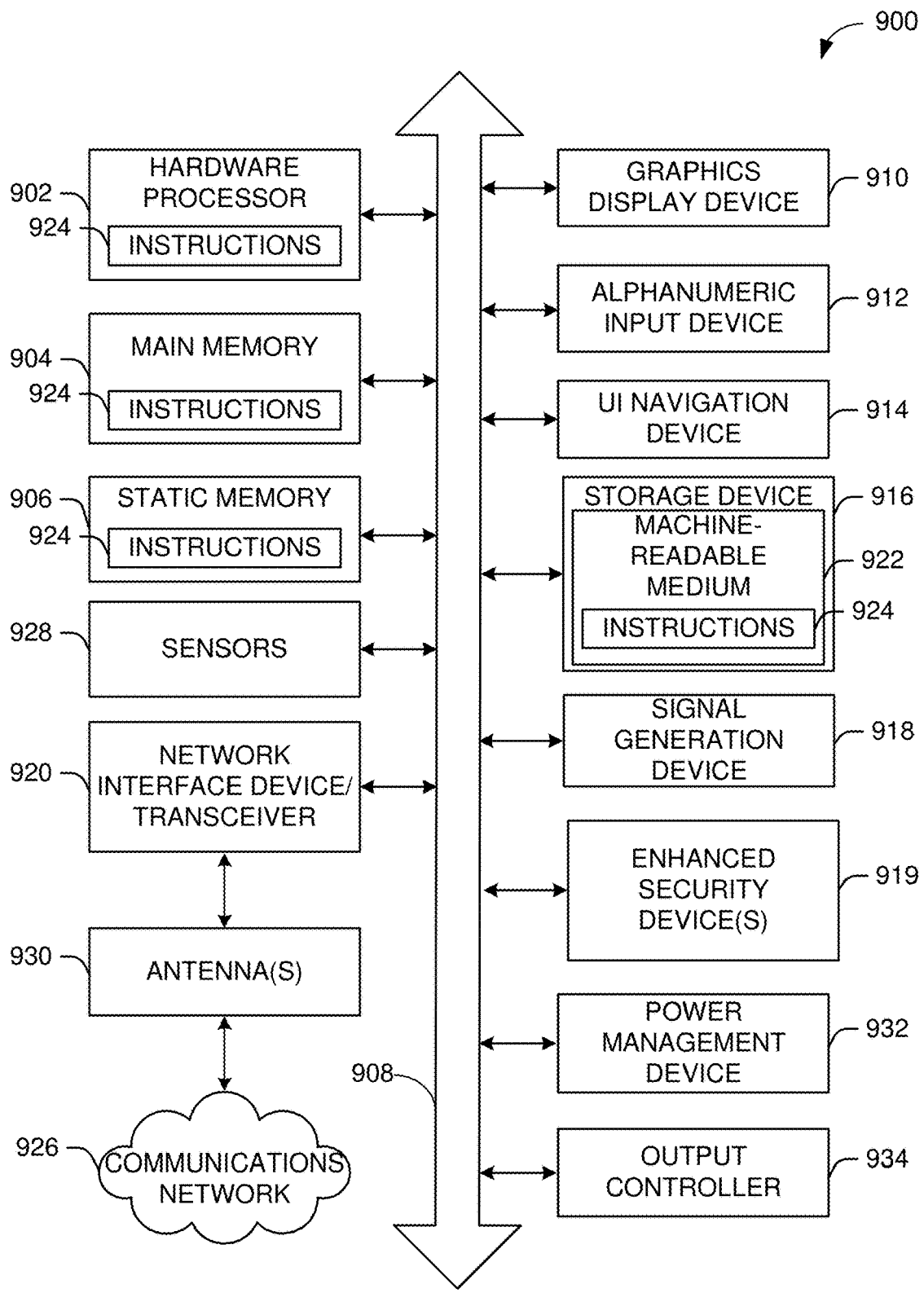
FIG. 9 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 8 and/or the example machine/system of FIG. 9.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols.

The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one or more embodiments, and with reference to FIG. 1, AP 102 may be considered an A MLD 138 logical/virtual entity with multiple AP STAs (e.g., AP 1 and AP 2), and a user device of the user devices 120 may be considered a MLD 140 logical/virtual entity with multiple non-AP STAs (e.g., non-AP STA 1 and non-AP STA 2). A first link 142 may be established between the AP 1 and the non-AP STA 1, and a second link 144 may be established between the AP 2 and the non-AP STA 2. Both the first link 142 and the second link 144 may be used simultaneously (e.g., the AP 102 and/or the user device 120 do not need to drop one of the links to use the other link). One or more frames 146 may be sent across the link 142, and one or more frames 148 may be sent across the link 144. The frames 146 and 148 may include security keys such as PTK, GTK, IGTK, and BIGTK, depending on the type of frames.

It is understood that the above descriptions are for purposes of illustration and are not meant to be limiting.

FIG. 2A illustrates an example authentication process 200, in accordance with one or more example embodiments of the present disclosure.

Referring to FIG. 2A, the authentication process 200 may include a supplicant device 202 (e.g., a non-AP STA, such as the user device 120 of FIG. 1), an authenticator device 204 (e.g., an AP, such as the AP 102 of FIG. 1), and an authentication server 206, and the authentication process 200 may be an IEEE 802.11 extensible authentication protocol (EAP) process. The authenticator device 204 may send an authentication request 208 to the supplicant device 202. The supplicant device 202 may send an authentication response 210 to the authenticator device 204. The authenticator device 204 may send an access request 212 to the authentication server 206. The authentication server 214 and the supplicant device 202 may perform an authentication protocol exchange 214 (e.g., an EAP exchange). The authentication server 206 may send an acceptance 216 (e.g., an EAP success indicator and key material) to the authenticator device 204, which may send an acceptance 218 to the supplicant device 202. The result may be an IEEE 802.11 port blocked for the supplicant device 202.

Figure 2B:
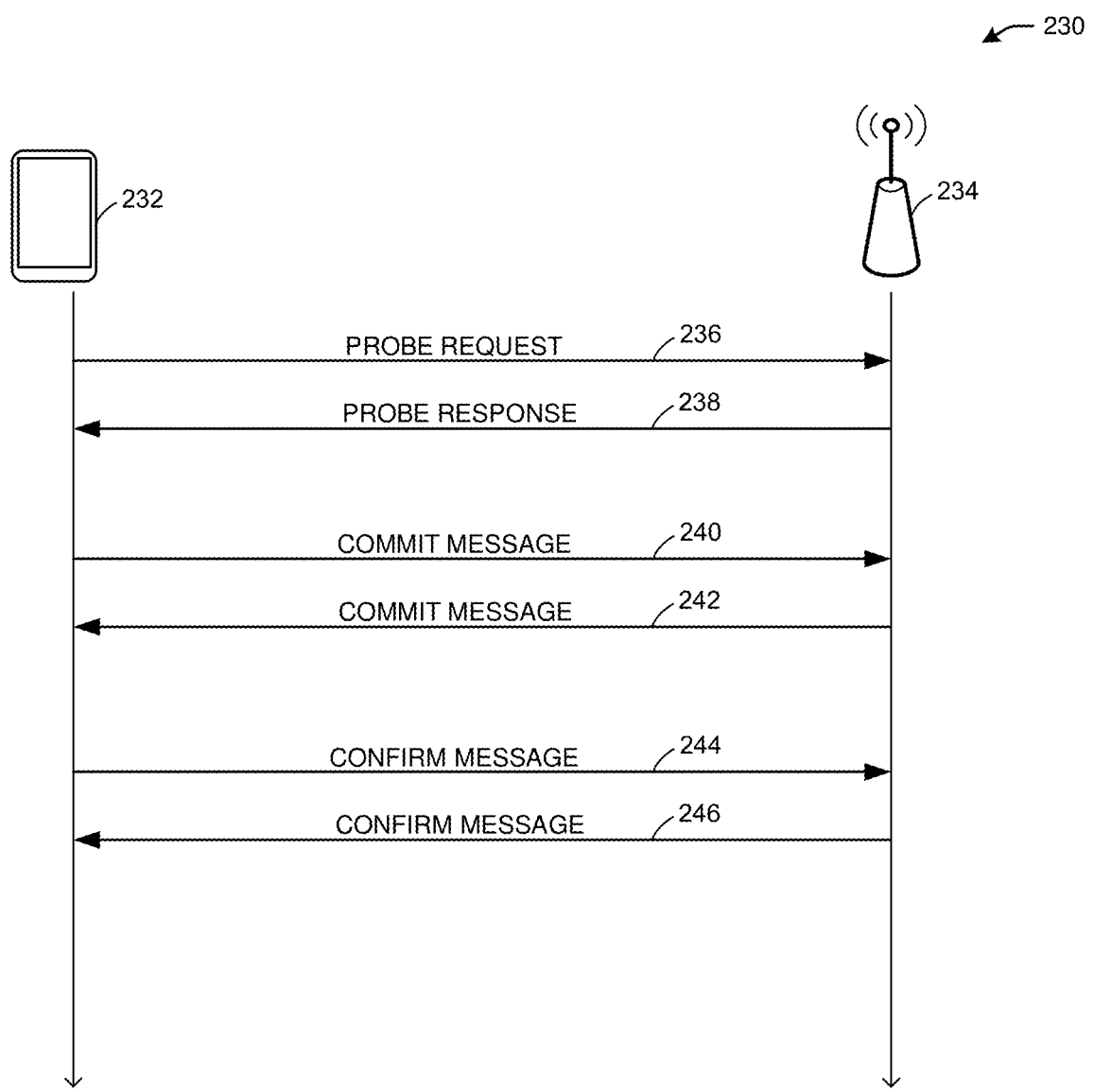
FIG. 2B illustrates an example authentication process, in accordance with one or more example embodiments of the present disclosure.

FIG. 2B illustrates an example authentication process 230, in accordance with one or more example embodiments of the present disclosure.

Referring to FIG. 2B, the authentication process 230 may include a STA 232 and an AP 234. The STA 232 may send a probe request 236 to the AP 234, and the AP 234 may send a probe response 238 to the STA 232. The STA 232 may send a commit message 240 (e.g., a simultaneous authentication of equals—SAE—authentication commit message) to the AP 234, and the AP 234 may send a commit message 242 (e.g., a SAE authentication commit message) to the STA 232. The STA 232 may send a confirm message 244 (e.g., a SAE authentication confirm message) to the AP 234, and the AP 234 may send a confirm message 246 (e.g., a SAE authentication confirm message) to the STA 232.

Figure 2C:
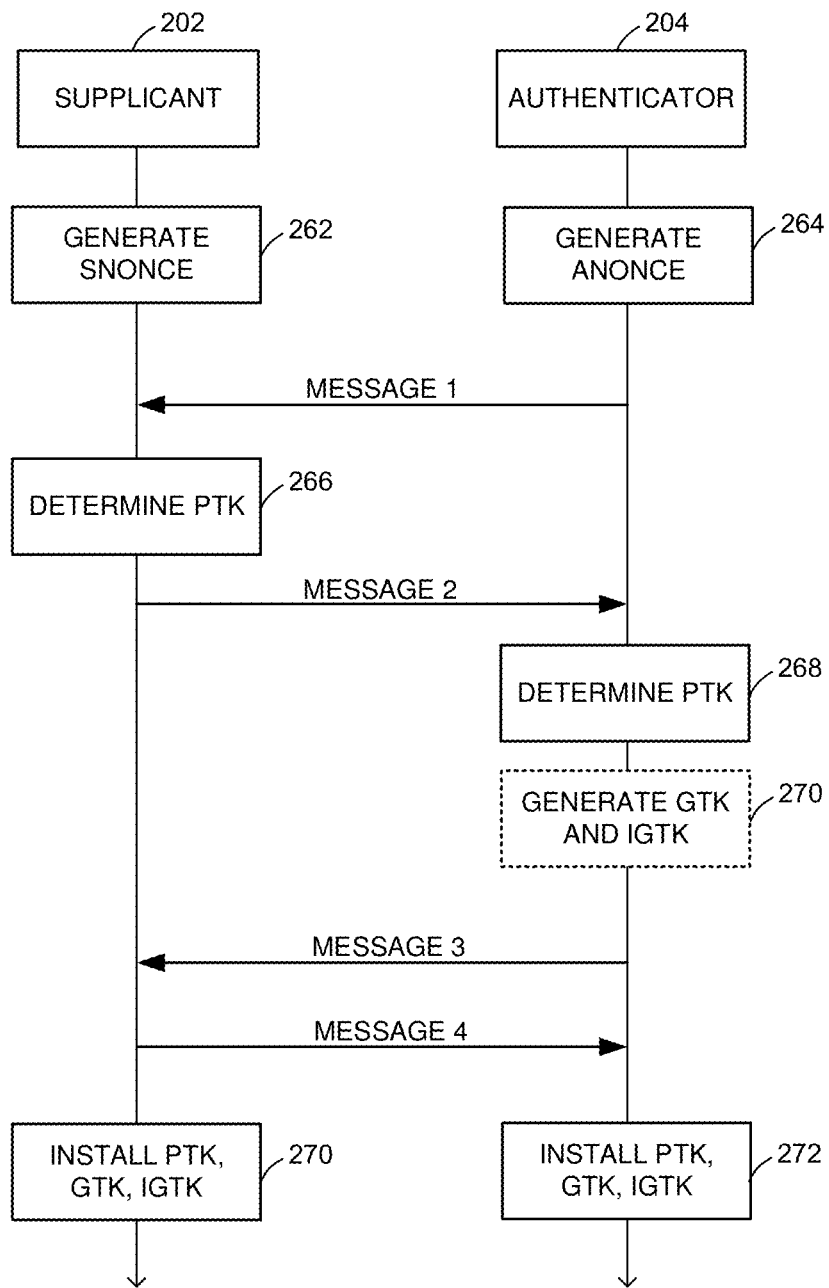
FIG. 2C illustrates an example four-way handshake process, in accordance with one or more example embodiments of the present disclosure.

FIG. 2C illustrates an example four-way handshake process 260, in accordance with one or more example embodiments of the present disclosure.

Referring to FIG. 2C, the four-way handshake process 260 may include the supplicant device 202 of FIG. 2A and the authenticator device 204 of FIG. 2A. The four-way handshake process 260 may use an extensible authentication protocol over LANs (EAPOL) frame to establish pairwise and group keys. At step 262, the supplicant device 202 may generate a SNonce value when a pairwise keymaster key (PMK) is known. At step 264, the authenticator device 204 may generate an ANonce value when the PMK is known. The authenticator device 204 may send message 1 to the supplicant device 202, message 1 including an EAPOL key (e.g., the ANonce value, individual indication). At step 266, the supplicant device 202 may determine the PTK. The supplicant device 202 may send message 2 to the authenticator device 204, message 2 including an EAPOL key (e.g., the SNonce value, individual indication, and MIC). At step 268, the authenticator device 204 may determine the PTK. If needed, optionally, at step 270, the authenticator device 204 may generate a GTK and IGTK. The authenticator 204 may send message 3 to the supplicant device 202, message 3 including an EAPOL key (e.g., install PTK, individual indication, MIC, and encrypted GTK and IGTK). The supplicant device 202 may send message 4 to the authenticator device 204, message 4 including an EAPOL key (e.g., individual indication, MIC). At step 270, the supplicant device 202 may install the PTK, GTK, and IGTK. At step 272, the authenticator device 204 may install the PTK, GTK, and IGTK. As a result, a blocked port on one of the devices may be unblocked.

After a PMK is generated, a PMKSA (PMK security association) may be generated. A PMKSA association is bidirectional, meaning that both parties may use the information in the security association for both sending and receiving. The PMKSA is used to create the PTKSA. PMK-SAs have a certain lifetime. The PMKSA may include a PMKID that identifies the security association; an authenticator's or peer's MAC address (e.g., for multi-band RSNA, the MAC address is associated with the operating band in use when the PMKSA is established); the PMK, the PMKSA lifetime, an authentication and key management protocol (AKMP); authorization parameters specified by the authentication server 206 or local configuration (e.g., including parameters such as the STA's authorized SSID); and a cache identifier, if advertised by an AP.

After a PTK is generated, a PTKSA (PTK security association) may be generated, and may include the PTK; a pairwise cipher suite selector; a supplicant MAC address or STA's MAC address; an authenticator MAC address or BSSID; and a Key ID. When FT key hierarchy is used, the PTKSA may include R1KH-ID, S1KH-ID, and PTKName.

After a GTK is generated, a GTKSA (GTK security association) may be generated, and may include a direction vector (e.g., indicating whether the GTK is used for transmit or receive); a group cipher suite selector, the GTK, the authenticator MAC address; key ID; authorization parameters specified by local configuration (e.g., including parameters such as the STA's authorized SSID).

After an IGTK is generated, an IGTKSA (IGTK security association) may be generated, and may include a direction vector (e.g., indicating whether the IGTK is used for transmit or receive); key ID; IGTK; and authenticator MAC address.

After a BIGTK is generated, a BIGTKSA (IGTK security association) may be generated, and may include a direction vector (e.g., indicating whether the BIGTK is used for transmit or receive); key ID; BIGTK; and authenticator MAC address.

Figure 3A:
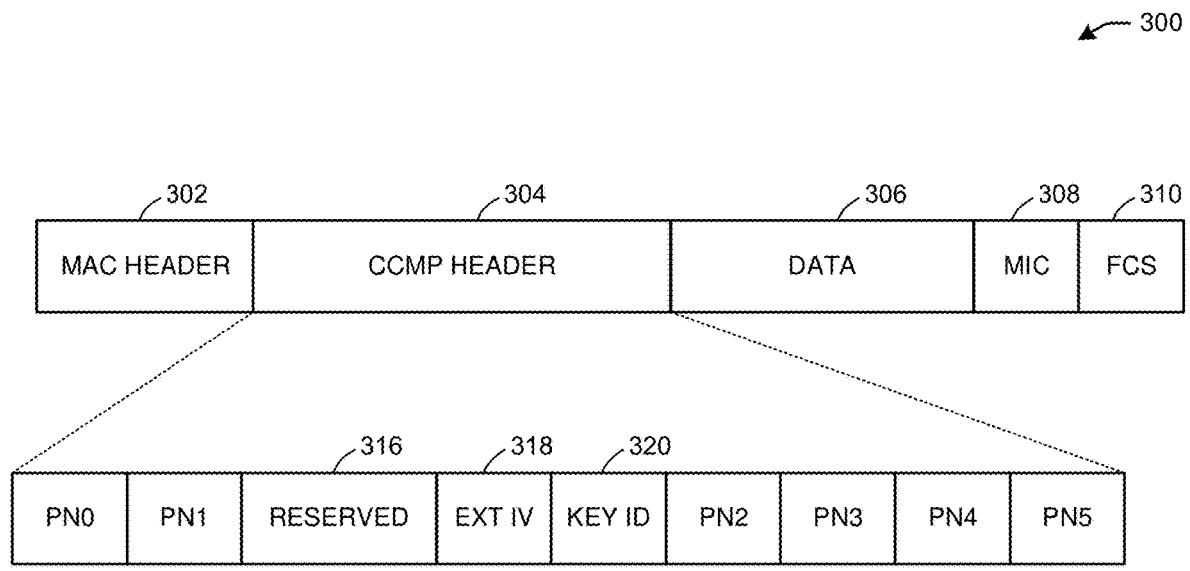
FIG. 3A illustrates an example portion of a data unit, in accordance with one or more example embodiments of the present disclosure.

FIG. 3A illustrates an example portion 300 of a data unit, in accordance with one or more example embodiments of the present disclosure. The portion 300 of a data unit may be an expanded CCMP MAC data unit (MPDU).

Referring to FIG. 3A, the portion 300 may include a MAC header 302, a CCMP header 304 (e.g., eight octets), data 306 (e.g., the PDU—at least one octet), a MIC 308 (e.g., variable length), and a frame check sequence (FCS) 310 (e.g., four octets). The CCMP header 304 may include packet numbers (PNs), such as PN0, PN1, PN2, PN3, PN4, PN5, etc., reserved bits, an extended IV field 318, and a key ID field 320.

In one or more embodiments, to address replay detection for usage of PTK and GTK, PNs may be used. The PNs (e.g., including at least eight bits each) may be used for replay detection. STAs may drop MPDUs based on a PN. There may be a replay counter for each PTKSA and GTKSA. There may be a separate replay counter for a traffic identifier (TID) when the STA supports the TID. The STA may detect a replay when a received PN is less than or equal to the current replay counter value (e.g., because the STA already received another packet with the same PN and updated the replay counter value accordingly). The STA may discard the data frame when a replay is detected. Replay detection may complete after a receiver reordering operation is performed if block-ACK mode is used.

The PN values sequentially number an MPDU. A transmitter may maintain a single PN (48-bit counter) for any PTKSA and GTKSA. The PN may be implemented as a 48-bit strictly increasing integer, initialized to 1 when the corresponding temporal key is initialized or refreshed.

A receiver may maintain a separate set of replay counters for any PTKSA, GTKSA, and protocol version value. The receiver may initialize the replay counters to 0 when the receiver resets the temporal key for a peer. The replay counter maybe set to the PN value of accepted CCMP MPDUs. For any PTKSA, GTKSA, and protocol version value, the recipient may maintain a separate replay counter for any TID, subject to the limitation of the number of supported replay counters indicated in the RSN Capabilities field, and may use the PN from a received frame to detect replayed frames. A replayed frame occurs when the PN from a received frame is less than or equal to the current replay counter value for the frame's MSDU or A-MSDU priority and frame type. When a "dot11RSNAProtectedManagementFramesActivated" is true, the recipient may maintain a single replay counter for received individually addressed robust Management frames that are received with the To DS subfield equal to 0, and a single replay counter for received individually addressed robust PV1 Management frames and may use the PN from the received frame to detect replays. When "dot11QMFActivated" is also true, the recipient may maintain an additional replay counter for each ACI for received individually addressed robust Management frames and robust PV1 Management frames that are received with the To DS subfield equal to 1. The QMF receiver may use the ACI encoded in the Sequence Number field of the received frame to select the replay counter to use for the received frame, and may use the PN from the received frame to detect replays. A replayed frame occurs when the PN from the frame is less than or equal to the current value of the management frame replay counter that corresponds to the ACI of the frame.

The receiver may discard any Data frame that is received with its PN less than or equal to the value of the replay counter that is associated with the TA and priority value of the received MPDU. The receiver may discard MSDUs and MMPDUs whose constituent MPDU PN values are not incrementing in steps of 1. When "dot11RSNAProtectedManagementFramesActivated" is true, the receiver may discard any individually addressed robust Management frame that is received with its PN less than or equal to the value of the replay counter associated with the TA of that individually addressed Management frame.

When discarding a frame, the receiver may increment by 1 "dot11RSNAStatsCCMPReplays" for Data frames or "dot11RSNAStatsRobustMgmtCCMP Replays" for robust Management frames.

For MSDUs or A-MSDUs sent using the block ack feature, reordering of received MSDUs or A-MSDUs according to the block ACK receiver operation may be performed prior to replay detection.

Figure 3B:
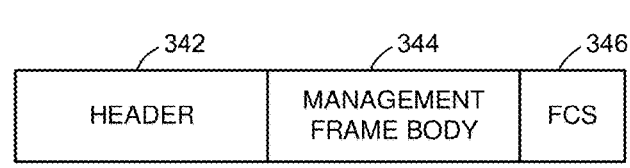
FIG. 3B illustrates an example portion of a management frame, in accordance with one or more example embodiments of the present disclosure.

FIG. 3B illustrates an example portion 340 of a management frame, in accordance with one or more example embodiments of the present disclosure. The portion 340 may refer to broadcast/multicast integrity protocol (BIP) encapsulation.

Referring to FIG. 3B, the portion 340 may include a header 342, a management frame body 344, and FCS 346. The management frame body 344 may include a MIC element.

For IGTK, a separate IPN (IGTK Packet Number) may be maintained as described herein. When management frame protection is negotiated, a receiver may maintain a 48-bit replay counter for any IGTK. The receiver may set the receive replay counter to the value of the IPN in the IGTK key data encapsulation (KDE) provided by the Authenticator in the 4-way handshake, FT 4-way handshake, FT handshake, group key handshake, or FILS authentication. A transmitter may maintain a single IPN for any IGTK. The IPN may be implemented as a 48-bit strictly increasing integer, initialized to 1 when the corresponding IGTK is initialized. The transmitter may reinitialize the sequence counter when the IGTK is refreshed.

For replay detection, IPN for a Key ID may be compared to the received PN value, and the frame may be discarded when PN is less than or equal to the value of the replay counter. The receiver may interpret the MIC IPN as a 48-bit unsigned integer. When the frame is not a group addressed quality-of-service management frame (GQMF), the receiver may compare the IPN integer value to the value of the receive replay counter for the IGTK identified by the Key ID field. When the integer value from the received IPN field is less than or equal to the replay counter value for the IGTK, the receiver may discard the frame and increment the "dot11SNAStatsCMAC Replays" counter by 1.

When the frame is a GQMF, the receiver may compare the IPN integer value to the value of the receive replay counter for the IGTK identified by the Key ID field, and the AC represented by the value of the ACI subfield of the received frame. When the integer value from the received IPN field is less than or equal to the replay counter value for this IGTK and AC, the receiver may discard the frame and increment the "dot11RSNAStatsCMACReplays" counter by 1.

Figure 4A:
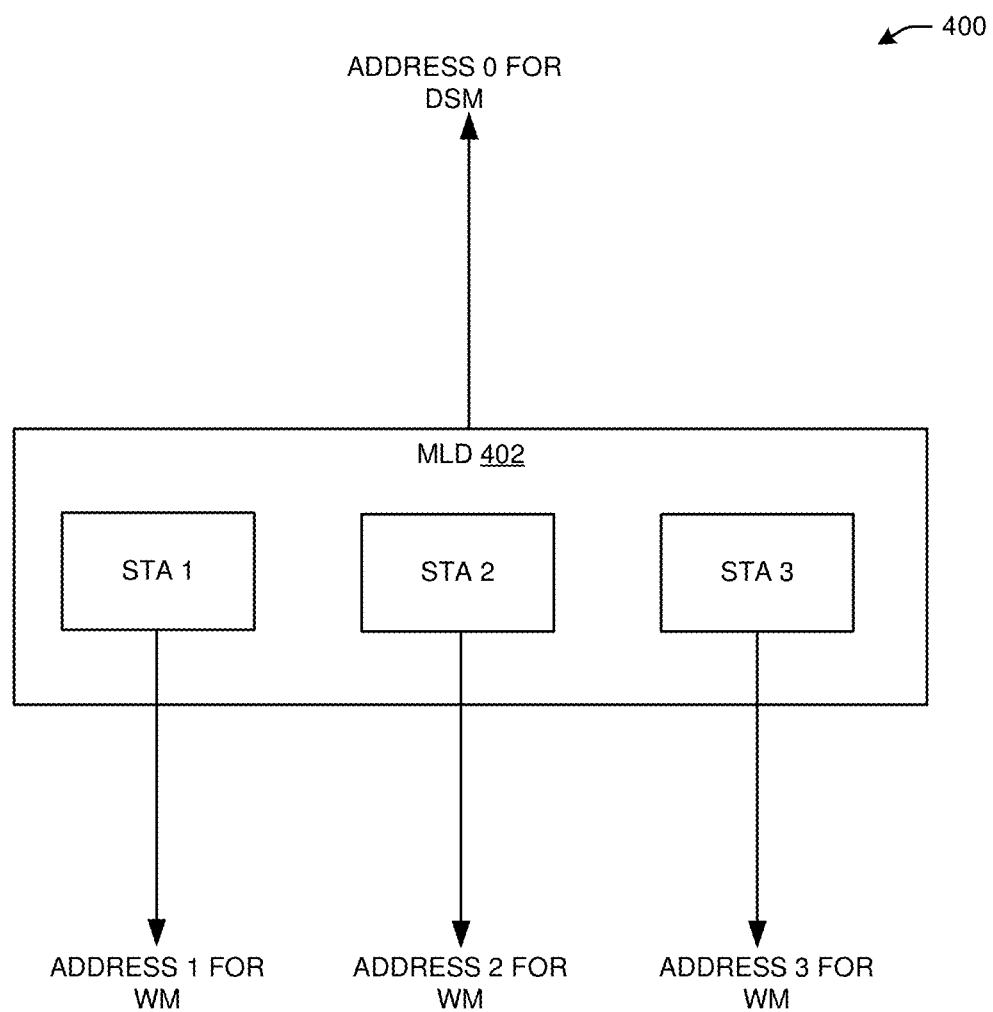
FIG. 4A depicts an example schematic diagram of a MLD, in accordance with one or more example embodiments of the present disclosure.

FIG. 4A depicts an example schematic diagram 400 of a MLD 402, in accordance with one or more example embodiments of the present disclosure.

Referring to FIG. 4A, the MLD 402 may be considered a logical/virtual entity with multiple STAs (e.g., STA 1, STA 2, STA 3).

In "extremely high throughput" (EHT) communication (e.g., as defined by the IEEE 802.11 technical standards), operation framework is expanded from operations between two physical STAs with one link established between the STAs to operations between two logical entities (e.g., MLDs such as MLD 402), where each logical entity has multiple STAs (e.g., STA 1, STA 2, STA 3), and one entry point for an upper logical link control (LLC) layer (e.g., address 0 for a distribution system medium DSM) for identification and one MAC data service interface and primitives for the upper LLC layer to use. The wireless mediums (WMs) used by each STA of the MLD 402 may refer to concurrently operating links, and may correspond to multiple addresses (e.g., address 1 for WM, address 2 for WM, address 3 for WM).

The MLD 402 may have a MAC data service interface and primitive to the LLC as defined by the IEEE 802.11 technical standards (e.g., in the MAC data service specification). As a result, from the LLC point of view, the MLD 402 may request a lower layer to transmit data or receive data from the lower layer without having the knowledge of one or multiple links. For routing reasons, the MLD 402 may need an address (e.g., address 0) to communicate with the DSM to allow for a packet to be routed in the DSM. The address for the DSM maybe same as or different from the MAC address used in the WM (e.g., address 0 may be the same as or different from any of the address 1, the address 2, and/or the address 3).

Figure 4B:
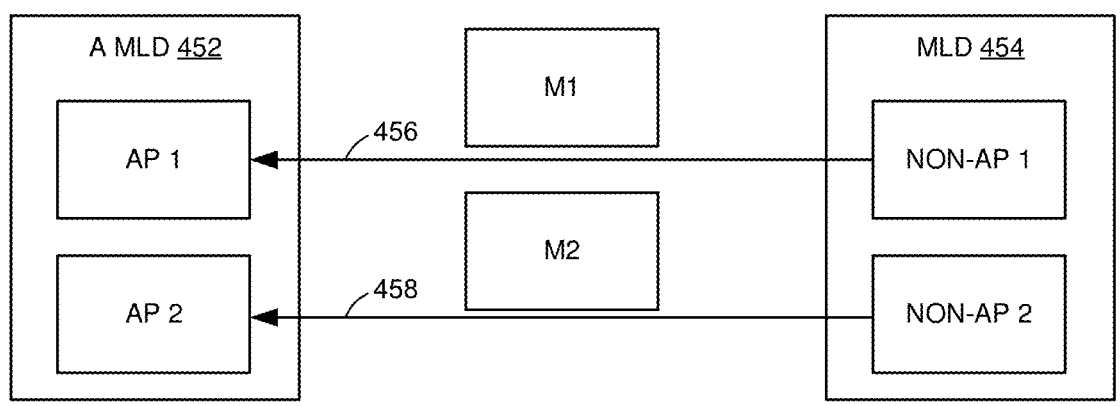
FIG. 4B depicts an example schematic diagram of two MLDs, in accordance with one or more example embodiments of the present disclosure.

FIG. 4B depicts an example schematic diagram 450 of two MLDs (e.g., MLD 452, MLD 454), in accordance with one or more example embodiments of the present disclosure.

Referring to FIG. 4B, the MLD 452 may be an A MLD with two APs (e.g., AP 1, AP 2), and the MLD 454 may have two non-AP STAs (e.g., non-AP 1, non-AP 2). A link 456 may be established between the AP 1 and the non-AP 1, and a separate link 458 may be established between the AP 2 and the non-AP 2. The non-AP 1 may send a message (e.g., M1) over the link 456, and the non-AP 2 may send a message (e.g., M2) over the link 458.

Figures 5A, 5B:
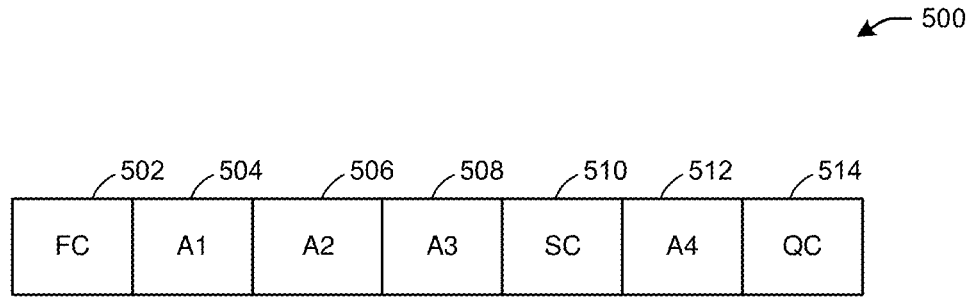
FIG. 5A illustrates an example portion of a data unit, in accordance with one or more example embodiments of the present disclosure.
FIG. 5B illustrates an example table defining a portion of the data unit of FIG. 5A, in accordance with one or more example embodiments of the present disclosure.

In some embodiments, a same or different key (PTK, GTK, IGTK, BIGTK) may be used in the messages (M1, M2) sent over the links 456 and 458, respectively. When same key is used for PTK, there is specific requirement that nonce needs to be unique for different encrypted messages. In some scenarios, nonce may be the same for different message. For example, when the same PTK is used in the message M1 and in the message M2, CCMP is used to encrypt both M1 and M2, and the MAC address of non-AP 1 is the same as the MAC address of non-AP 2, the additional authentication data (AAD) of M1 and M2 will be different because an A1 field (e.g., the destination address, as shown in FIG. 5A) included in M1 will be different than the A1 field included in M2 due to different destination addresses of AP 1 and AP 2. However, the nonce values of M1 and M2 may be the same nonce values because nonce values are based on an A2 field (e.g., transmitter address, shown in FIG. 5A) of M1 and M2, and because non-AP 1 and non-AP 2 share the same MAC address. As a result, the security requirement of having a unique nonce value for different messages across links would be violated. In this manner, there are multiple enhancement options described below to avoid non-compliance with the security requirement.

FIG. 5A illustrates an example portion 500 of a data unit, in accordance with one or more example embodiments of the present disclosure.

Referring to FIG. 5A, the portion 500 may be the AAD construction of a MPDU (e.g., M1 and M2 of FIG. 4B). The portion 500 may include a field check 502, A1 field 504 (e.g., destination address field), A2 field 506 (e.g., transmitter address field), an A3 field 508, a sequence counter (SC) field 510, an A4 field 512, and a quality control (QC) field 514.

FIG. 5B illustrates an example table 550 defining a portion of the data unit of FIG. 5A, in accordance with one or more example embodiments of the present disclosure.

Referring to FIG. 5B, the table 550 may define values of AAD length for a MPDU (e.g., M1 and M2 of FIG. 4B). When the QC field 514 and the A4 field 512 of FIG. 5A are absent, the AAD length of the MPDU may be 22 octets. When the QC field 514 is present and the A4 field 512 is absent, the AAD length of the MPDU may be 24 octets. When the QC field 514 is absent and the A4 field 512 is present, the AAD length of the MPDU may be 28 octets. When the QC field 514 and the A4 field 512 both are present, the AAD length of the MPDU may be 30 octets.

Figure 6A:
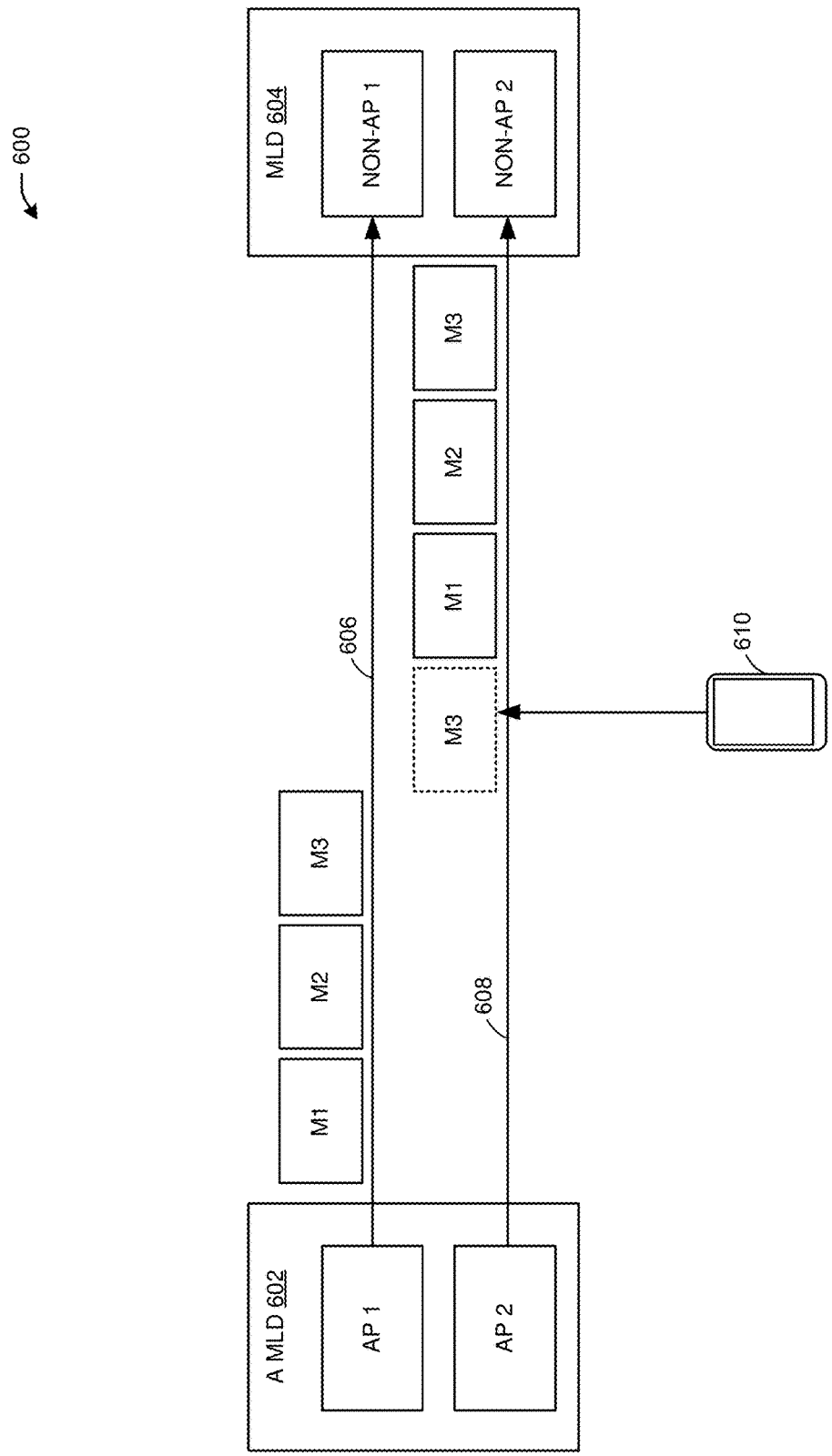
FIG. 6A depicts an example schematic diagram of two MLDs, in accordance with one or more example embodiments of the present disclosure.

FIG. 6A depicts an example schematic diagram 600 of two MLDs (e.g., A MLD 602, MLD 604), in accordance with one or more example embodiments of the present disclosure.

Referring to FIG. 6A, the A MLD 602 may include AP 1 and AP 2, and the MLD 604 may include non-AP 1 and non-AP 2. A link 606 may be established between the AP 1 and the non-AP 1, and a link 608 may be established between the AP 2 and the non-AP 2. The AP 1 may send a sequence of group-addressed messages (e.g., M1, M2, M3) over the link 606, and the AP 2 may send the same sequence of messages over the link 608. Because the encryption of the sequence of messages on the link 606 may be the same encryption for the same sequence of messages on the link 608, an attacker device 610 may send one of the messages (e.g., M3) on the link 608 before the AP 2 sends the sequence on the link 608, preventing the non-AP 2 from receiving the sequence of messages. In particular, when the group-addresses messages of the sequence (e.g., having PNs 5, 6, and 7, respectively) are transmitted over both links (e.g., when different respective legacy STAs not shown in FIG. 6A are using the different links instead of the MLD 604 as shown), the same group-addressed messages may need to be sent to the different legacy STAs. When AP 1 and AP 2 have a same MAC address, the BSSID of AP 1 is the same as the BSSID of AP 2. When CCMP is used for encryption on both links, the attacker device 610 may send M3 over the link 608 (e.g., when the attacker device 610 receives M3 over the link 606), resulting in one or more STAs using the link 608 receiving M3 and updating their respective replay counters, thereby resulting in a denial of service attack that prevents reception of the sequence of messages sent by the AP 2 over the link 608. To avoid a security attack by the attacker device 610, security enhancements may be implemented as described below.

When a same key is used for IGTK and BIGTK across the two links, it may be possible that the MICs of the two links are exactly the same for a group-addressed management frame or beacon frame, and the frames may be replayed in another link with various problems. When a different key is used for GTK, IGTK, or BIGTK across the two links, the details of how the key may be conveyed in the 4-way handshake of FIG. 2C may need to be defined.

Referring to FIGS. 2A-6E, for the security issue of using same PTK, we propose mechanism to facilitate different nonce when same message may be transmitted with different AAD in different links.

For the security issue of group addressed frames, the encryption method in different links for the same message may be different. The method includes different GTK, BIGTK, or IGTK, different MAC addresses for STAs of MLDs, and defines delivery of different GTK, IGTK, BIGTK.

For the situation with a same PTK across multiple links, there are two options. Option 1: When the MAC addresses of AP1 and AP 2 of FIG. 6A are different addresses, then the MAC addresses of non-AP 1 and non-AP 2 of FIG. 6A may be different addresses. Option 2: When the MAC addresses of non-AP 1 and non-AP 2 of FIG. 6A are different addresses, and the MAC addresses of AP1 and AP 2 of FIG. 6A are the same address, then the AAD construction (e.g., as shown in FIG. 5A) of a unicast transmission from AP 1 to non-AP 1 or from AP 2 to non-AP 2 (e.g., using the link 608 or the link 608) may be modified by replacing the MAC addresses of non-AP 1 and non-AP 2 with MAC addresses of MLD 604 to the upper layer (e.g., address 0 of MLD 402 in FIG. 4A, where MLD 402 represents the MLD 604). As a unified solution, the AAD construction of unicast transmission from AP 1 to non-AP 1 or from AP 2 to non-AP 2 may be modified by replacing the MAC addresses of AP 1 and AP 2 with the MAC addresses of MLD 602 to the upper layer (e.g., address 0 of MLD 402 in FIG. 4A, where MLD 402 represents A MLD 602). As another unified solution, the AAD construction of a unicast transmission from non-AP 1 to AP 1 or from non-AP 2 to AP 2 may be modified by replacing the MAC addresses of the AP 1 and the AP 2 with the MAC addresses of the MAC addresses of MLD 602 to the upper layer (e.g., address 0 of MLD 402 in FIG. 4A, where MLD 402 represents A MLD 602) and the MLD 604 to the upper layer (e.g., address 0 of MLD 402 in FIG. 4A, where MLD 402 represents the MLD 604).

For the GTK, IGTK, and BIGTK situations, the general concept may be that the encryption method of the same group addressed message transmitted in different links should not be the same.

For GTK, there may be several options to facilitate the use of different encryption methods for a group addressed message that is transmitted over multiple links. Option 1: A different GTK may be used across the different links, or 1) Enable one 4-way handshake to deliver the GTK in different links; 2) Enable one group key handshake to deliver the GTK in different links; 3) Develop a new multi-link GTK KDE includes the following fields: Key ID as defined in GTK KDE; Tx as defined in GTK KDE; Link ID that identifies the link; and GTK of the identified link. The link without a multi-link GTK KDE may use the default GTK of the 4-way handshake. The multi-link GTK KDE may be included in message 3 of the 4 way handshake. The multi-link GTK KDE may be included in message 1 of the group key handshake. In GTKSA, the link ID may be included in a message to differentiate different GTKSAs. In GTKSA, the authenticator address may be the MAC address of the MAC addresses of MLD 602 to the upper layer (e.g., address 0 of MLD 402 in FIG. 4A, where MLD 402 represents A MLD 602). Different links may use the same cipher suite indicated in the RSNE of the 4-way handshake. Different cipher suites across links may also be used along with different GTKs. A Group Data Cipher Suite field and link ID may be included in message 3 of a 4-way handshake to indicate the cipher suite used in the link identified by the link ID. The Group Data Cipher Suite field and link ID may be included in a multi-link element of a message.

Option 2 for GTK: STAs of the A MLD 602 (e.g., AP 1, AP 2) may have different MAC addresses. Option 3 for GTK: For two links, when the MAC addresses of the STAs of A MLD 602 are the same, then different GTKs may be used. Otherwise, a same GTK may be used. A new multi-link GTK KDE and corresponding design may be developed as described in option 1 for GKT.

For IGTK, there may be multiple options. Option 1: A different IGTK may used across links. A 4-way handshake may be enabled to deliver the IGTK in different links. A group key handshake may be enabled to deliver the IGTK in different links. A new multi-link IGTK KDE may be developed, including the following fields: Key ID as defined in IGTK KDE; Link ID that identifies the link; IGTK of the identified link; and IPN as defined in IGTK KDE for the link. The multi-link IGTK KDE may be included in message 3 of the 4 way handshake. The multi-link IGTK KDE may be included in message 1 of the group key handshake.

In IGTKSA, the link ID maybe included to differentiate different IGTKSAs. In IGTKSA, the authenticator address may be the MAC addresses of MLD 602 to the upper layer (e.g., address 0 of MLD 402 in FIG. 4A, where MLD 402 represents A MLD 602). Different links may use the same cipher suite indicated in the RSNE of the 4-way handshake. Different cipher suite across links may also be used along with different IGTKs. A Group Management Cipher Suite field and link ID may be included in message 3 of 4-way handshake to indicate the cipher suite used in the link identified by the link ID. The Group Management Cipher Suite field and link ID may be included in a multi-link element.

Option 2 for IGTK: STAs of the A MLD 602 may have different MAC addresses.

Option 3 for IGTK: For two links, when the MAC addresses of the STAs of the A MLD 602 are the same, then different IGTKs may be used across different links. Otherwise, a same IGTK may be used across different links. A new multi-link IGTK KDE and corresponding design may be defined as described in option 1.

For BIGTK, there may be several options. Option 1: Different BIGTKs may be used across different links. A 4-way handshake may be enabled to deliver the BIGTKs in different links. A group key handshake may be enabled to deliver the BIGTKs in different links. A new multi-link BIGTK KDE may be developed, including the following fields: Key ID as defined in BIGTK KDE; Link ID that identifies the link; BIGTK of the identified link; and BIPN as defined in BIGTK KDE for the link. The multi-link BIGTK KDE may be included in message 3 of the 4 way handshake. The multi-link BIGTK KDE may be included in message 1 of the group key handshake. In BIGTKSA, link ID may be included to differentiate different IGTKSAs. In BIGTKSA, the authenticator address may be the MAC addresses of MLD 602 to the upper layer (e.g., address 0 of MLD 402 in FIG. 4A, where MLD 402 represents A MLD 602). Different links may use the same cipher suite indicated in the RSNE of the 4-way handshake. Different cipher suite across links may also be used along with different BIGTKs. A Group Management Cipher Suite field and link ID may be included in message 3 of 4-way handshake to indicate the cipher suite used in the link identified by the link ID. The Group Management Cipher Suite field and link ID may be included in a multi-link element.

Option 2 of BIGTK: STAs of A MLD 602 may have different MAC addresses.

Option 3 of BIGTK: For two links, when the MAC addresses of the STAs of A MLD 602 are the same, then different BIGTKs may be used. Otherwise, a same BIGTK may be used. A new multi-link BIGTK KDE and corresponding design may be developed as described in option 1.

Figure 6B:
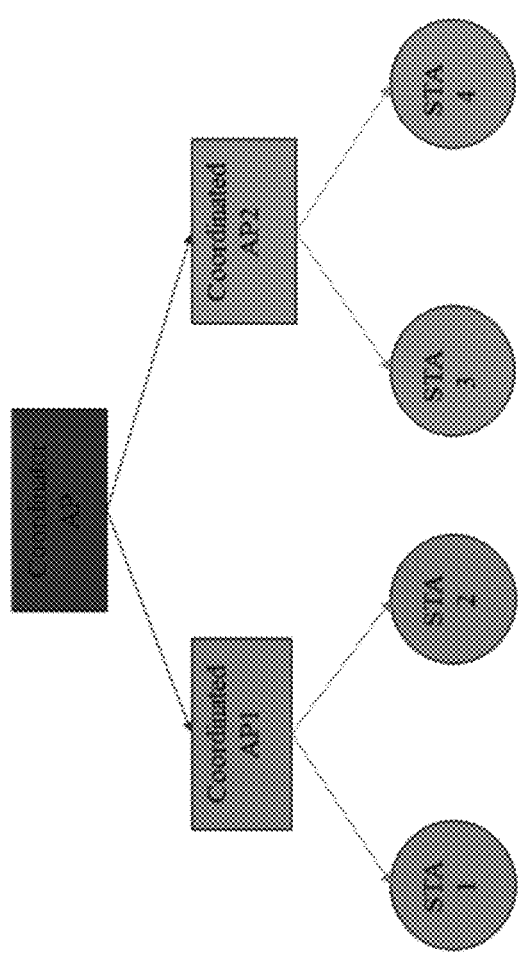
FIG. 6B depicts an example multi-access point group, in accordance with one or more example embodiments of the present disclosure.

FIG. 6B depicts an example multi-AP group 620, in accordance with one or more example embodiments of the present disclosure.

Referring to FIG. 6B, the multi-AP group 620 may include a coordinator AP to coordinate operations with two coordinated APs (e.g., coordinated AP1, coordinated AP2). The coordinated AP1 may communicate with multiple STAs (e.g., STA1, STA2), and the coordinated AP2 may communicate with multiple STAs (e.g., STA3, STA4).

The overall proposal can be summarized as follows.

Step 1: Define the Multi-AP group consisting of a single Coordinator AP and one or more Coordinated APs. However, the specific group formation procedures and Coordinator AP selection are out of scope of IEEE 802.11be. Instead, they are left to be either Wi-Fi Alliance (WFA) defined methods, or implementation specific.

Step 2. The Coordinator AP is responsible for handling long-term management or control functions, which basically includes Multi-AP group security and Multi-AP group policy.

The Multi-AP group security includes a way to distribute the key for authenticating and verifying the Multi-AP Trigger frame sent within a Multi-AP group. Therefore, the Multi-AP Trigger frames are protected from potential outside attack, which may happen when an illegitimate AP transmits fake Multi-AP Trigger frames to impact the normal operations of some APs in a Multi-AP group.

In one or more embodiments, a multi-AP group security and policy system may facilitate protecting the Multi-AP Trigger frames by using the cipher-based message authentication code (CMAC) and Galois message authentication code (GMAC) cipher suites. No encryption is applied over the Multi-AP Trigger frame, but an integrity check field (e.g., message integrity code (MIC)) is added to the Multi-AP Trigger frame, allowing the APs to verify in a secure manner that the Multi-AP Trigger frame is transmitted by an authenticated AP in the same Multi-AP group and it is not manipulated by a third party. Further details are provided below.

APs in the group can exchange the supported cipher suites of the associated STAs. The information can be obtained from the group management cipher suite in RSNE element since the same cipher suite of group management protection is used here. Without exchange, the default cipher suites can be BIP-CMAC-128.

One key method: The coordinator AP can distribute the key (say MIGTK (multi-AP integrity group temporal key)) to other APs in the group.

Two key ID are defined to facilitate key update procedure.
The distribution method can be implementation specific.
The distribution method can be defined in the WFA.

For each key, there is a transmitter address, key ID, and 48 bits MPN (MIGTK PN) associated with the key during distribution.

Multi-key method: Each AP x in the group that is allowed to send AP Trigger frame generates a key, say MIGTK x, and distributes to other APs in the group.

Two key ID are defined to facilitate key update procedure.
The distribution method can be implementation specific.
The distribution method can be defined in the WFA.

For each key, there is a transmitter address, key ID, and MPN (MIGTK) associated with the key during distribution.

Distribution of key to associated STAs:

Multi-AP IGTK KDE can be defined to be included in message 3 of 4-way handshake and message 1 of group key handshake of each BSS.

Multi-AP IGTK KDE can include:

Address of the AP sends the Trigger frame; Key ID; MIGTK Key; MPN.

Replay Counter:

The receiver shall maintain a 48-bit replay counter for each MIGTK. i) Under multi-key method, there is one replay counter for each MIGTK. ii) Under one key method, there can be one replay counter or multiple replay counter for different transmitter address.

The receiver initializes each replay counter to corresponding value distributed by the associated AP.

The receiver updates each replay counter to corresponding value in the received AP Trigger frame if MIC verification passes. i) Based on corresponding transmitter address of the AP Trigger frame under multiple replay counter method. ii) Update under one replay counter method The transmitter of the Trigger frame maintains one MPN for the corresponding MIGTK. i) Under multi-key method, different transmitter uses independent MPN. ii) Under one-key method, different transmitter needs to have synchronized MPN, where a same MPN is not used twice, if the receiver only maintains one replay counter. iii) Under one-key method, a different transmitter needs to have synchronized MPN if the receiver can maintain multiple replay counter. iv) MPN shall be implemented as a 48-bit strictly increasing integer, initialized to 1 when the corresponding MIGTK is initialized. The transmitter may reinitialize the sequence counter when the MIGTK is refreshed.

AAD includes the following: Frame control; A1; A2; The following field are masked to 0: i) Retry subfield (bit 11) masked to 0; 2) Power Management subfield (bit 12) masked to 0; c) More Data subfield (bit 13) masked to 0.

Initialization vector (IV) includes the following: A2; MPN.

Include the following fields in AP Trigger frame: MPN; Key ID; MIC. i) MIC is calculated over the concatenation of AAD and all fields in front of the MIC field.

A method may include or not include the above fields and signal to the receiver.

Replay detection: Identify the transmitter address of the Trigger frame if needed; Find corresponding stored MPN and MIGTK; Drop the frame if: i) MPN in the AP Trigger frame is smaller than equal to the stored MPN; Maintain replay attack statistics counter for each MPN. i) Increase the counter by 1 if replay is detected.

MIC verification: Maintain MIC error statistics counter for each MPN; i) Increase the counter by 1 if MIC verification fails.

Step 3: To facilitate specific trigger operations and coordination functions, the Coordinator AP defines the Multi-AP policy within the Multi-AP group as the operation rules, which all Coordinated APs have to comply with.

The primary motivation for Multi-AP feature is to leverage the coordination among multiple APs to optimize a system-level metric, such as the overall throughput or worst-case latency within the network.

APs in a Multi-AP group may come from different vendors and are designed with different scheduling/operating algorithms. If there is no policy that guides the operations of different APs to achieve a common objective, they will proceed with their own algorithms without a consensus and therefore coordination becomes difficult and challenging.

The Multi-AP policy can be flexibly adjusted to accommodate different requirements associated with different use cases or application scenarios.

The Multi-AP policy can be advertised by a broadcast management or control frame transmitted by the Coordinator AP to all Coordinated APs in the same Multi-AP group, or it can also be transmitted unicast to each Coordinated AP individually.

The Multi-AP policy can include the common group objective, such as system throughput or average latency, and operation rules such as who can send the Multi-AP Trigger frames, which types of Multi-AP coordination functions are allowed (coordinated OFDMA, coordinated BF, joint BF, joint processing etc.), or whether the EDCA parameters of certain Coordinated APs are changed.

Step 4: When it comes to specific triggering operations, depending on how the Multi-AP policy is set, there are multiple possible modes as described further herein.

Figure 6C:
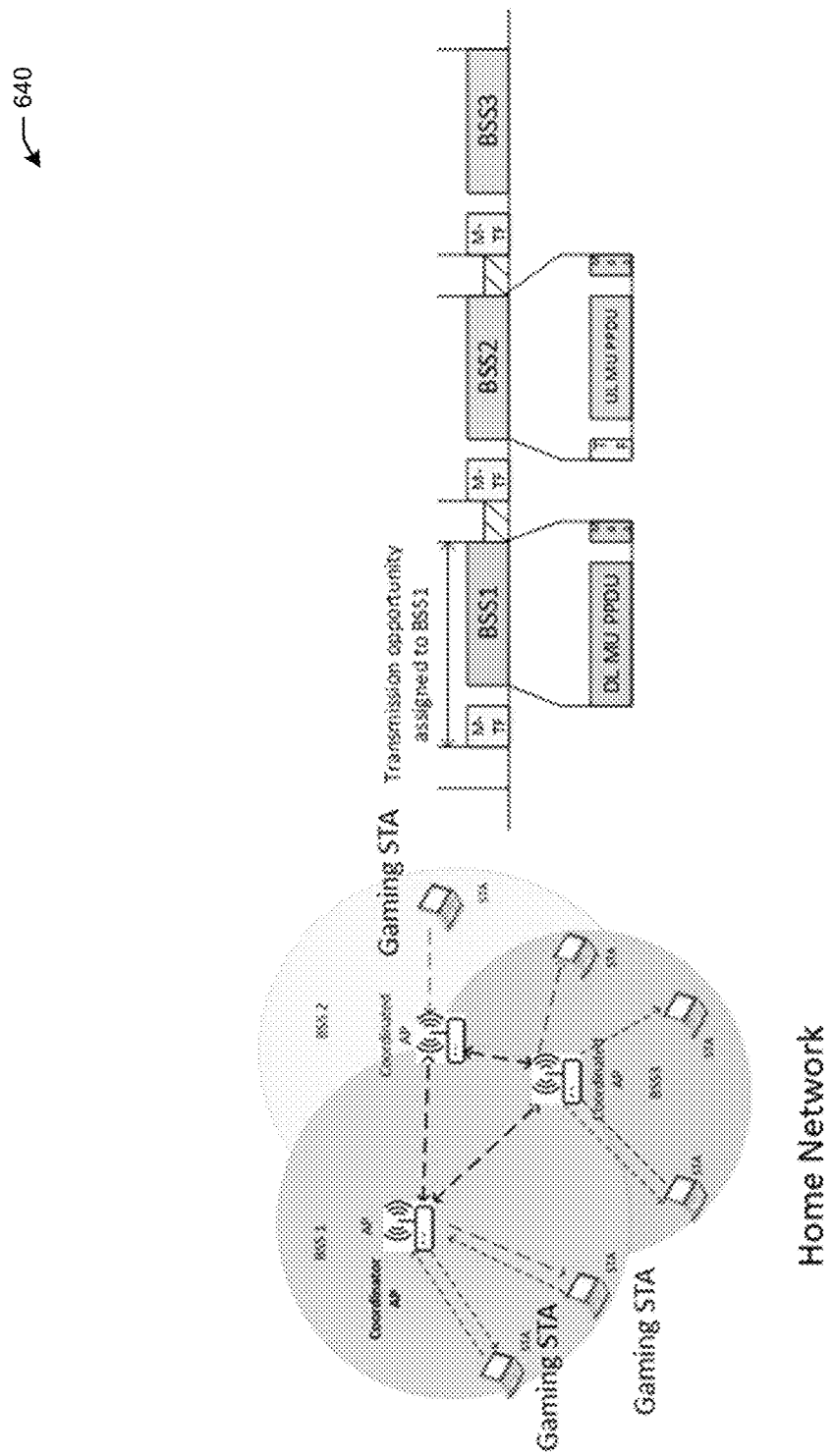
FIG. 6C depicts an example of trigger-based coordination transmission opportunities, in accordance with one or more example embodiments of the present disclosure.

FIG. 6C depicts an example of trigger-based coordination TXOPs 640, in accordance with one or more example embodiments of the present disclosure.

As explained above regarding step 4 for FIG. 6B, a coordinator AP may trigger coordinator operations using one of multiple modes.

In one mode, the Coordinator AP always triggers the coordination operations. This mode is suitable for small-size networks where triggering only by Coordinator AP is feasible, or in application scenarios where fully scheduled/trigger-based access controlled by the Coordinator AP is needed. For example, TSN applications such as mobile gaming in a home scenario, where the Coordinator AP schedules time periods for other Coordinated APs depending on the traffic type.

Figure 6D:
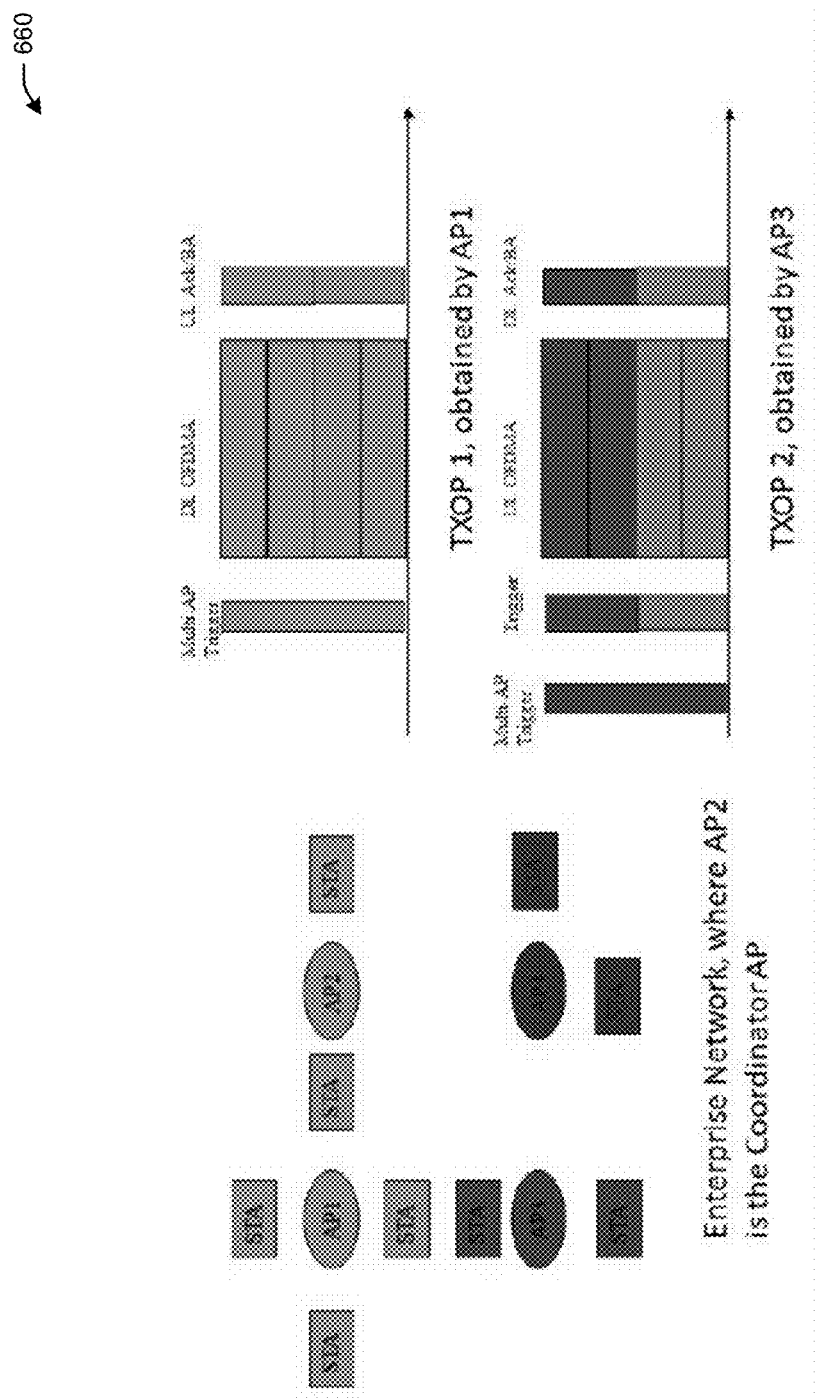
FIG. 6D depicts an example of trigger-based coordination transmission opportunities, in accordance with one or more example embodiments of the present disclosure.

FIG. 6D depicts an example of trigger-based coordination TXOPs 660, in accordance with one or more example embodiments of the present disclosure.

As explained above regarding step 4 for FIG. 6B, a coordinator AP may trigger coordinator operations using one of multiple modes.

In one mode, coordinated APs may trigger the coordination operations: This mode is suitable for a large-size network where triggering only by Coordinator AP is challenging, or in application scenarios where coordination operations do not necessarily require the Coordinator AP to participate. For example, any Coordinated AP that has obtained a TXOP can initiated coordinated OFDMA with other APs in the same Multi-AP group.

Figure 6E:
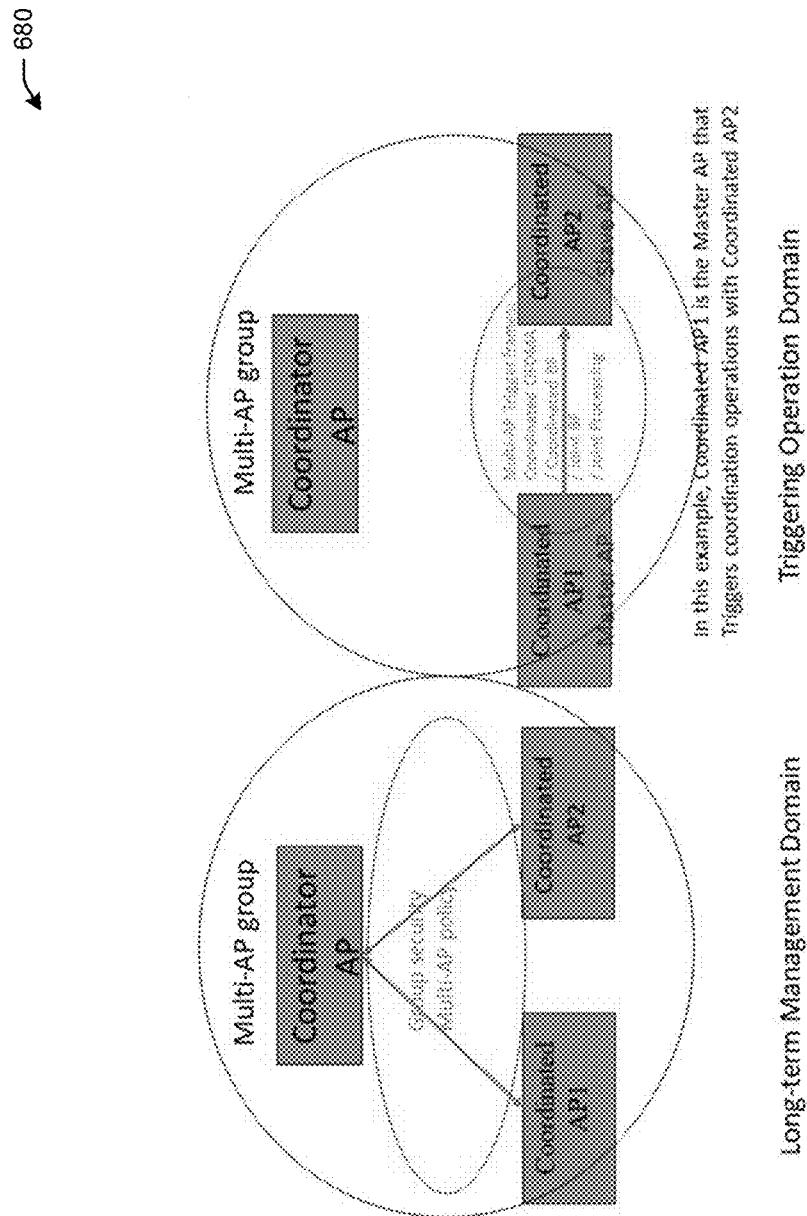
FIG. 6E depicts examples of trigger-based coordination transmission opportunities, in accordance with one or more example embodiments of the present disclosure.

An overall view of the modes shown in FIG. 6C and FIG. 6D is shown in FIG. 6E.

FIG. 6E depicts examples of trigger-based coordination TXOPs 680, in accordance with one or more example embodiments of the present disclosure.

The examples of FIGS. 6C and 6D are shown in FIG. 6E in a long-term management domain and in a triggering operation domain.

Figure 7A:
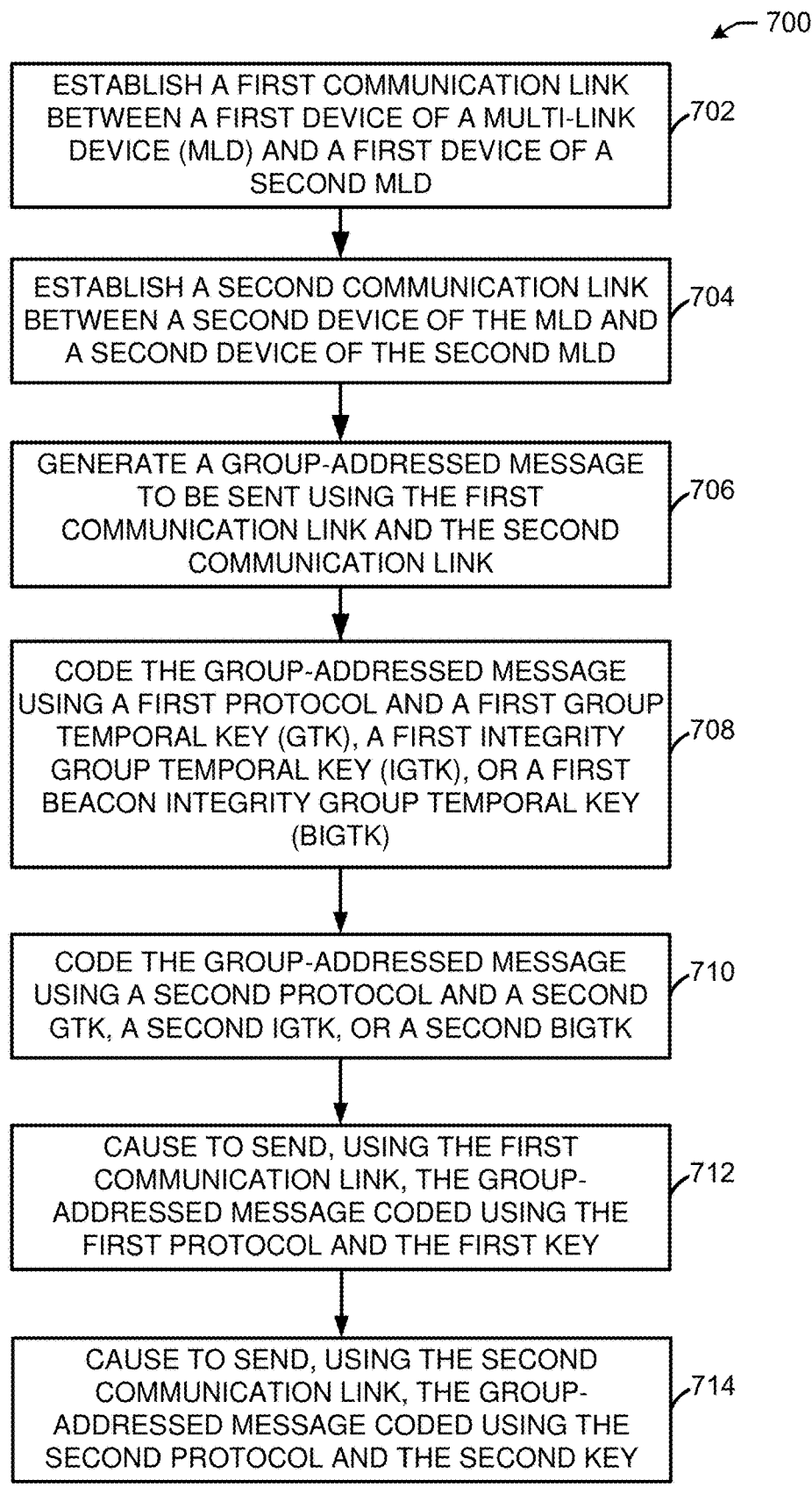
FIG. 7A illustrates a flow diagram of an illustrative process for a multi-link operation follow up system, in accordance with one or more example embodiments of the present disclosure.

FIG. 7A illustrates a flow diagram of illustrative process 700 for a multi-link operation follow up system, in accordance with one or more example embodiments of the present disclosure.

At block 702, a MLD (e.g., the user device(s) 120 and/or the AP 102 of FIG. 1, the MLD 402 of FIG. 4A, the A MLD 452 of FIG. 4B, the MLD 454 of FIG. 4B, the A MLD 602 of FIG. 6A, the MLD of FIG. 6A) may establish a first communication link (e.g., the link 456 of FIG. 4B, the link 606 of FIG. 6A) between a first device of the MLD and a first device of another MLD. The MLD may be a MLD and the other MLD may be an A MLD, or the MLD may be an MLD and the other MLD may be a MLD. When the MLD is an A MLD, the A MLD may include AP devices. When the MLD is a MLD, the MLD may include non-AP STAs. In this manner, the first communication link may be between an AP device of an A MLD and a non-AP STA of a MLD (and may be used by other non-AP STAs of other MLDs).

At block 704, the MLD may establish a second communication link between a second device of the MLD and a second device of the other MLD. The second communication link may be used concurrently with the first communication link. For example, the second communication link may be between an AP of an A MLD and a non-AP STA of a MLD, and traffic may be sent over the both the first communication link and the second communication link without having to disconnect one of the communication links. In this manner, establishing the second communication link does not require switching from the first communication link to the second communication link.

At block 706, the MLD may generate a group-addressed message (e.g., a MPDU, such as the messages M1, M2, M3 of FIG. 6A) to be sent using the first communication link and the second communication link. In particular, the group-addressed message may be a MPDU using a GTK key or IGTK key, or may be a beacon using a BIGTK key. In this manner, the group-addressed messages may be sent to multiple devices (e.g., AP devices of one or more A MLDs or non-AP STAs of MLDs) using the first and second communication links. To avoid security attacks, the group-addressed message may need to be encoded using different methods for the different respective communication links.

At block 708, the MLD may code the group-addressed message using a first encryption protocol and a first GTK, a first integrity protocol and a first IGTK, or a second integrity protocol and a first BIGTK. At block 710, the MLD may code the group-addressed message using the first encryption protocol and a second GTK, the first integrity protocol and a second IGTK, or the second integrity protocol and a second BIGTK. The GTKs, IGTKs, and BIGTKs may be established using a four-way handshake (e.g., FIG. 2C) or a group key handshake to deliver the keys to the devices using the first and second communication links. The first and second devices of the A MLD may use different MAC addresses to result in different keys being used on the respective communication links. In this manner, the first and second communication links may send the same information of the group-addressed message, but using different protocols and keys. The keys may be included in a multi-link KDE of the group-addressed message, and the multi-link KDE may include a key identifier field, a transmitter field, and GTK fields when delivering the GTK. The multi-link KDE may include the key identifier field, an integrity packet number, and IGTK fields when delivering the IGTK. The multi-link KDE may include the key identifier field, a beacon integrity packet number, and BIGTK fields when delivering the BIGTK.

At block 712, the MLD may send the group-addressed message, coded using the first encryption method and the first GTK, or using the first integrity protocol and the first IGTK, or using the second integrity protocol and the first BIGTK, over the first communication link. At block 714, the MLD may send the group-addressed message, coded using the first encryption method and the second GTK, or using the first integrity protocol and the second IGTK, or using the second integrity protocol and the second BIGTK, over the second communication link.

Figure 7B:
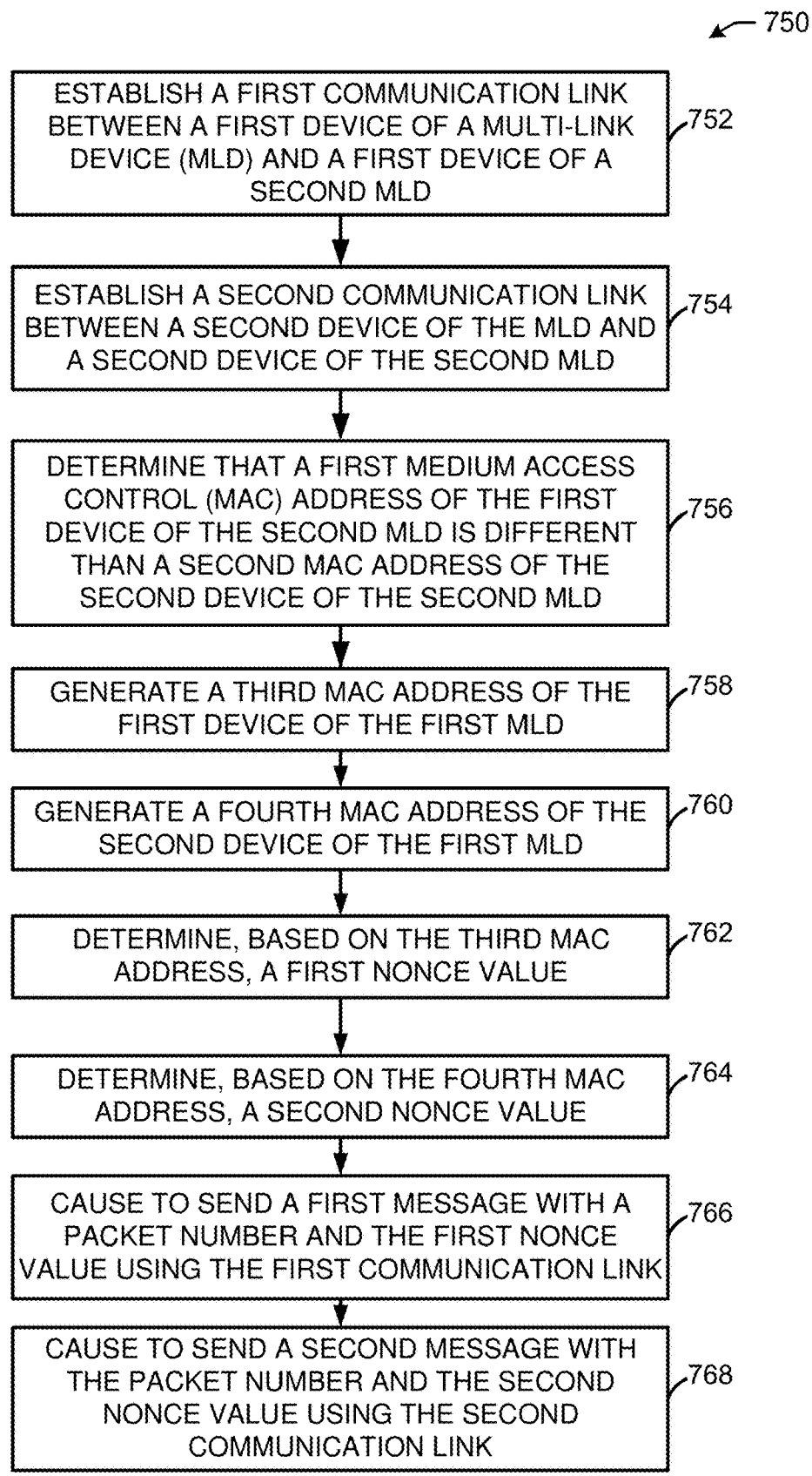
FIG. 7B illustrates a flow diagram of an illustrative process for a multi-link operation follow up system, in accordance with one or more example embodiments of the present disclosure.

FIG. 7B illustrates a flow diagram of illustrative process 750 for a multi-link operation follow up system, in accordance with one or more example embodiments of the present disclosure.

At block 752, a MLD (e.g., the user device(s) 120 and/or the AP 102 of FIG. 1, the MLD 402 of FIG. 4A, the A MLD 452 of FIG. 4B, the MLD 454 of FIG. 4B, the A MLD 602 of FIG. 6A, the MLD of FIG. 6A) may establish a first communication link (e.g., the link 456 of FIG. 4B, the link 606 of FIG. 6A) between a first device of the MLD and a first device of another MLD. The MLD may be a MLD and the other MLD may be an A MLD, or the MLD may be an MLD and the other MLD may be a MLD. When the MLD is an A MLD, the A MLD may include AP devices. When the MLD is a MLD, the MLD may include non-AP STAs. In this manner, the first communication link may be between an AP device of an A MLD and a non-AP STA of a MLD (and may be used by other non-AP STAs of other MLDs).

At block 754, the MLD may establish a second communication link between a second device of the MLD and a second device of the other MLD. The second communication link may be used concurrently with the first communication link. For example, the second communication link may be between an AP of an A MLD and a non-AP STA of a MLD, and traffic may be sent over the both the first communication link and the second communication link without having to disconnect one of the communication links. In this manner, establishing the second communication link does not require switching from the first communication link to the second communication link.

At block 756, the MLD may determine that the MAC addresses of the first and second devices of the other MLD are different MAC addresses (e.g., different from one another). MAC addresses may be used in ML setup between a non-AP MLD and an A MLD. When a PTK is used, either the same PTK or different PTKs may be used across the multiple links. When the same PTK is used across multiple links, there is a requirement that the nonce value needs to be unique for each encrypted message. For example, a message sent across multiple links between MLDs the nonce value needs to be different in each message. However, because nonce is generated using a transmitter address, a transmitting MLD with the same transmitter address for different MLD STAs may result in the same nonce.

At block 758, the MLD may generate a MAC address of the first device of the MLD. At block 760, the MLD may generate a different MAC address of the second device of the MLD. In this manner, the MLD may set the MAC addresses of its devices to be different from one another, thereby affecting the nonce values generated for transmissions across the first and second communication links.

At block 762, the MLD may determine a first nonce value based on the MAC address of the first device of the MLD. At block 764, the MLD may determine a second nonce value based on the MAC address of the second device of the MLD. In this manner, by setting different MAC addresses for the MLD's different devices in response to establishing that the MAC addresses of the other MLD are different MAC addresses from one another, the MLD may ensure that the nonce values for the first and second communication links are unique nonce values.

At block 766, the MLD may send a first message (e.g., M1 of FIG. 4B) using the first communication link. At block 768, the MLD may send a second message (e.g., M2 of FIG. 4B) using the second communication link. The first message may include the first nonce value and a PTK, and the second message may include the second nonce value and the PTK.

It is understood that the above descriptions are for purposes of illustration and are not meant to be limiting.

FIG. 8 shows a functional diagram of an exemplary communication station 800, in accordance with one or more example embodiments of the present disclosure. In one embodiment, FIG. 8 illustrates a functional block diagram of a communication station that may be suitable for use as an AP 102 (FIG. XX) or a user device 120 (FIG. XX) in accordance with some embodiments. The communication station 800 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 800 may include communications circuitry 802 and a transceiver 810 for transmitting and receiving signals to and from other communication stations using one or more antennas 801. The communications circuitry 802 may include circuitry that can operate the physical layer (PHY) communications and/or medium access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in the above figures, diagrams, and flows.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918 (e.g., a speaker), one or more enhanced security devices 919, a network interface device/transceiver 920 coupled to antenna(s) 930, and one or more sensors 928, such as a global positioning system (GPS) sensor, a compass, an accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 902 for generation and processing of the baseband signals and for controlling operations of the main memory 904, the storage device 916, and/or the one or more enhanced security devices 919. The baseband processor may be provided on a single radio card, a single chip, or an integrated circuit (IC).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The one or more enhanced security devices 919 may carry out or perform any of the operations and processes (e.g., process 700 of FIG. 7, process 750 of FIG. 7B) described and shown above.

It is understood that the above are only a subset of what the one or more enhanced security devices 919 may be configured to perform and that other functions included throughout this disclosure may also be performed by the one or more enhanced security devices 919.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 10:
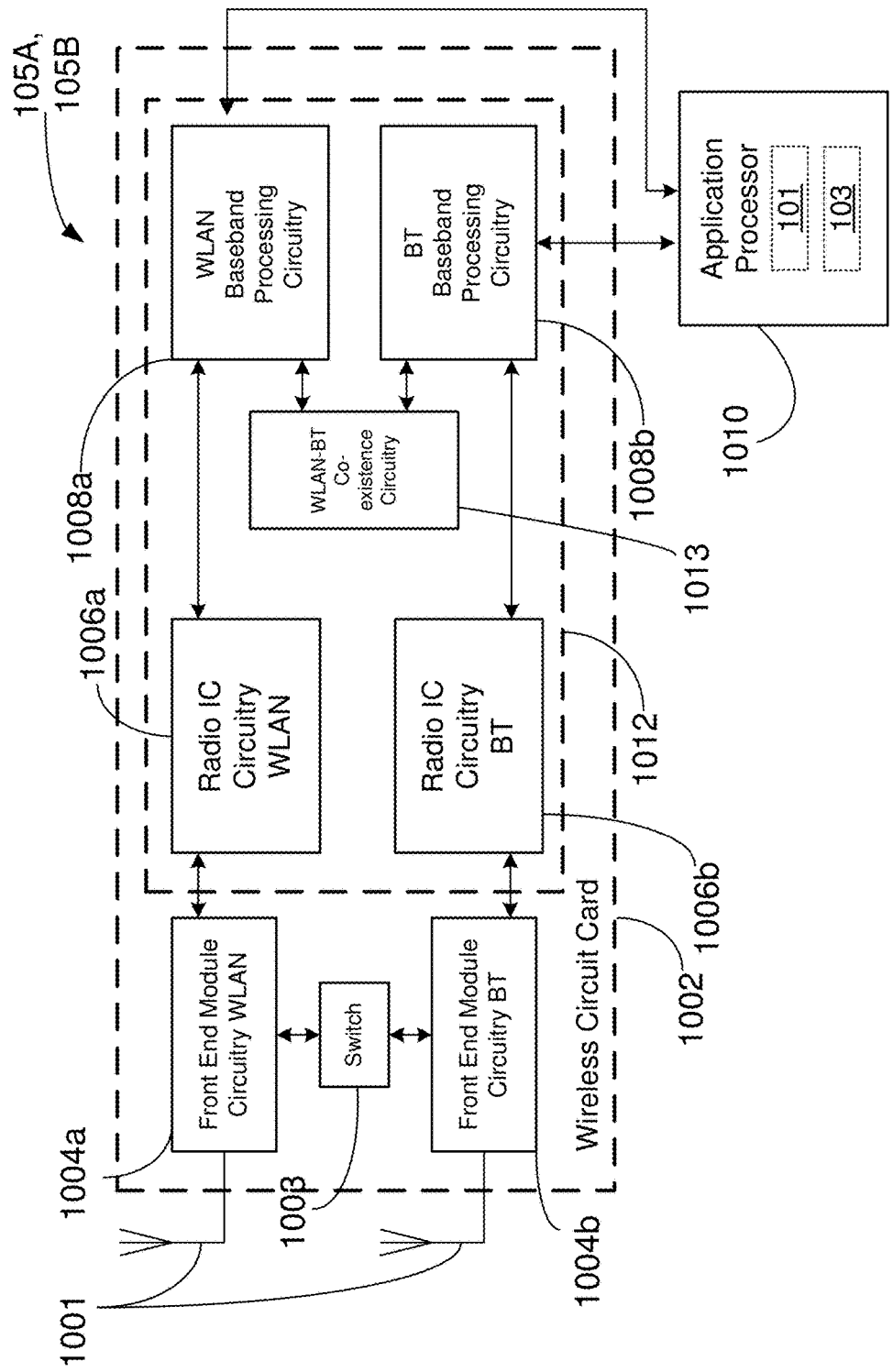
FIG. 10 is a block diagram of a radio architecture in accordance with some examples.

FIG. 10 is a block diagram of a radio architecture 105A, 105B in accordance with some embodiments that may be implemented in any one of the example AP 102 and/or the example STA 120 of FIG. 1. Radio architecture 105A, 105B may include radio front-end module (FEM) circuitry 1004a-b, radio IC circuitry 1006a-b and baseband processing circuitry 1008a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1004a-b may include a WLAN or Wi-Fi FEM circuitry 1004a and a Bluetooth (BT) FEM circuitry 1004b. The WLAN FEM circuitry 1004a may include a receive signal path comprising circuitry configured to operate on WLAN RF signals received from one or more antennas 1001, to amplify the received signals and to provide the amplified versions of the received signals to the WLAN radio IC circuitry 1006a for further processing. The BT FEM circuitry 1004b may include a receive signal path which may include circuitry configured to operate on BT RF signals received from one or more antennas 1001, to amplify the received signals and to provide the amplified versions of the received signals to the BT radio IC circuitry 1006b for further processing. FEM circuitry 1004a may also include a transmit signal path which may include circuitry configured to amplify WLAN signals provided by the radio IC circuitry 1006a for wireless transmission by one or more of the antennas 1001. In addition, FEM circuitry 1004b may also include a transmit signal path which may include circuitry configured to amplify BT signals provided by the radio IC circuitry 1006b for wireless transmission by the one or more antennas. In the embodiment of FIG. 10, although FEM 1004a and FEM 1004b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1006a-b as shown may include WLAN radio IC circuitry 1006a and BT radio IC circuitry 1006b. The WLAN radio IC circuitry 1006a may include a receive signal path which may include circuitry to down-convert WLAN RF signals received from the FEM circuitry 1004a and provide baseband signals to WLAN baseband processing circuitry 1008a. BT radio IC circuitry 1006b may in turn include a receive signal path which may include circuitry to down-convert BT RF signals received from the FEM circuitry 1004b and provide baseband signals to BT baseband processing circuitry 1008b. WLAN radio IC circuitry 1006a may also include a transmit signal path which may include circuitry to up-convert WLAN baseband signals provided by the WLAN baseband processing circuitry 1008a and provide WLAN RF output signals to the FEM circuitry 1004a for subsequent wireless transmission by the one or more antennas 1001. BT radio IC circuitry 1006b may also include a transmit signal path which may include circuitry to up-convert BT baseband signals provided by the BT baseband processing circuitry 1008b and provide BT RF output signals to the FEM circuitry 1004b for subsequent wireless transmission by the one or more antennas 1001. In the embodiment of FIG. 10, although radio IC circuitries 1006a and 1006b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 1008a-b may include a WLAN baseband processing circuitry 1008a and a BT baseband processing circuitry 1008b. The WLAN baseband processing circuitry 1008a may include a memory, such as, for example, a set of RAM arrays in a Fast Fourier Transform or Inverse Fast Fourier Transform block (not shown) of the WLAN baseband processing circuitry 1008a. Each of the WLAN baseband circuitry 1008a and the BT baseband circuitry 1008b may further include one or more processors and control logic to process the signals received from the corresponding WLAN or BT receive signal path of the radio IC circuitry 1006a-b, and to also generate corresponding WLAN or BT baseband signals for the transmit signal path of the radio IC circuitry 1006a-b. Each of the baseband processing circuitries 1008a and 1008b may further include physical layer (PHY) and medium access control layer (MAC) circuitry, and may further interface with a device for generation and processing of the baseband signals and for controlling operations of the radio IC circuitry 1006a-b.

Referring still to FIG. 10, according to the shown embodiment, WLAN-BT coexistence circuitry 1013 may include logic providing an interface between the WLAN baseband circuitry 1008a and the BT baseband circuitry 1008b to enable use cases requiring WLAN and BT coexistence. In addition, a switch 1003 may be provided between the WLAN FEM circuitry 1004a and the BT FEM circuitry 1004b to allow switching between the WLAN and BT radios according to application needs. In addition, although the antennas 1001 are depicted as being respectively connected to the WLAN FEM circuitry 1004a and the BT FEM circuitry 1004b, embodiments include within their scope the sharing of one or more antennas as between the WLAN and BT FEMs, or the provision of more than one antenna connected to each of FEM 1004a or 1004b.

In some embodiments, the front-end module circuitry 1004a-b, the radio IC circuitry 1006a-b, and baseband processing circuitry 1008a-b may be provided on a single radio card, such as wireless radio card 1002. In some other embodiments, the one or more antennas 1001, the FEM circuitry 1004a-b and the radio IC circuitry 1006a-b may be provided on a single radio card. In some other embodiments, the radio IC circuitry 1006a-b and the baseband processing circuitry 1008a-b may be provided on a single chip or integrated circuit (IC), such as IC 1012.

In some embodiments, the wireless radio card 1002 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6A, the BT baseband circuitry 1008b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 11:
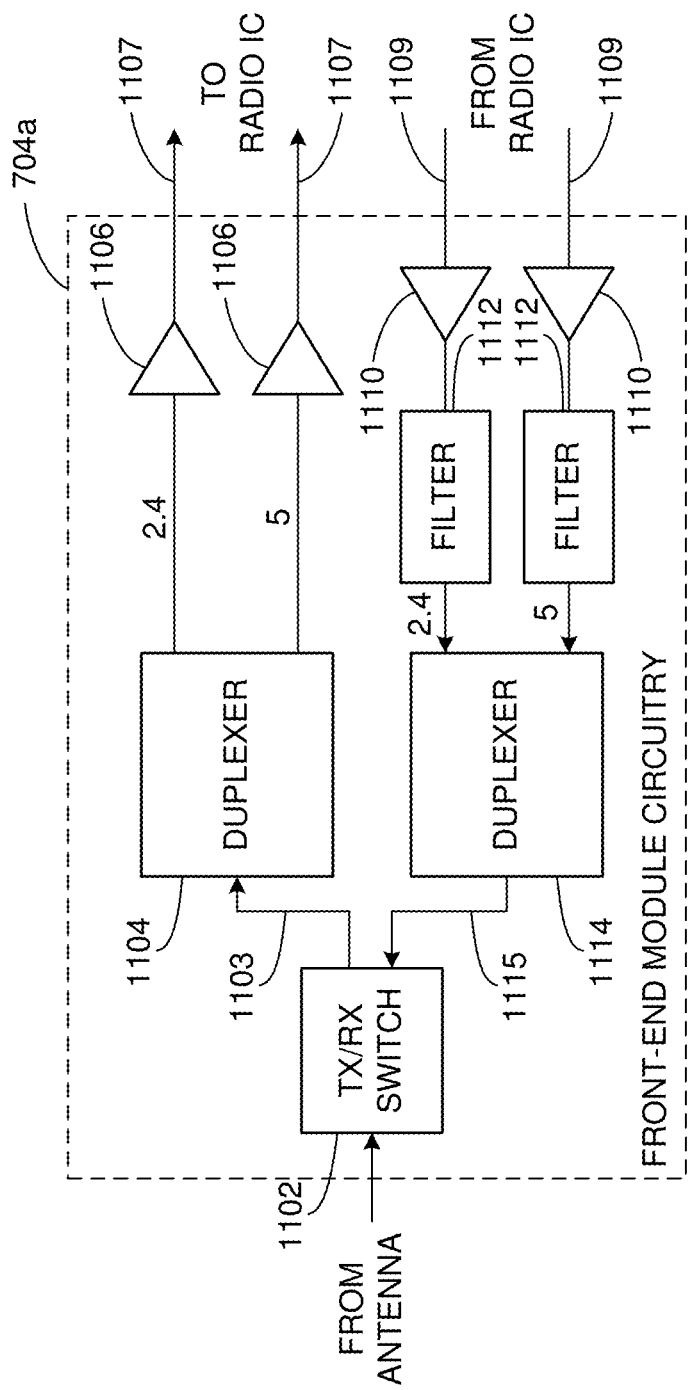
FIG. 11 illustrates an example front-end module circuitry for use in the radio architecture of FIG. 10, in accordance with one or more example embodiments of the present disclosure.

FIG. 11 illustrates WLAN FEM circuitry 1004a in accordance with some embodiments. Although the example of FIG. 11 is described in conjunction with the WLAN FEM circuitry 1004a, the example of FIG. 11 may be described in conjunction with the example BT FEM circuitry 1004b (FIG. 10), although other circuitry configurations may also be suitable.

In some embodiments, the FEM circuitry 1004a may include a TX/RX switch 1102 to switch between transmit mode and receive mode operation. The FEM circuitry 1004a may include a receive signal path and a transmit signal path. The receive signal path of the FEM circuitry 1004a may include a low-noise amplifier (LNA) 1106 to amplify received RF signals 1103 and provide the amplified received RF signals 1107 as an output (e.g., to the radio IC circuitry 1006a-b (FIG. 10)). The transmit signal path of the circuitry 1004a may include a power amplifier (PA) to amplify input RF signals 1109 (e.g., provided by the radio IC circuitry 1006a-b), and one or more filters 1112, such as band-pass filters (BPFs), low-pass filters (LPFs) or other types of filters, to generate RF signals 1115 for subsequent transmission (e.g., by one or more of the antennas 1001 (FIG. 10)) via an example duplexer 1114.

In some dual-mode embodiments for Wi-Fi communication, the FEM circuitry 1004a may be configured to operate in either the 2.4 GHz frequency spectrum or the 5 GHz frequency spectrum. In these embodiments, the receive signal path of the FEM circuitry 1004a may include a receive signal path duplexer 1104 to separate the signals from each spectrum as well as provide a separate LNA 1106 for each spectrum as shown. In these embodiments, the transmit signal path of the FEM circuitry 1004a may also include a power amplifier 1110 and a filter 1112, such as a BPF, an LPF or another type of filter for each frequency spectrum and a transmit signal path duplexer 1104 to provide the signals of one of the different spectrums onto a single transmit path for subsequent transmission by the one or more of the antennas 1001 (FIG. 10). In some embodiments, BT communications may utilize the 2.4 GHz signal paths and may utilize the same FEM circuitry 1004a as the one used for WLAN communications.

Figure 12:
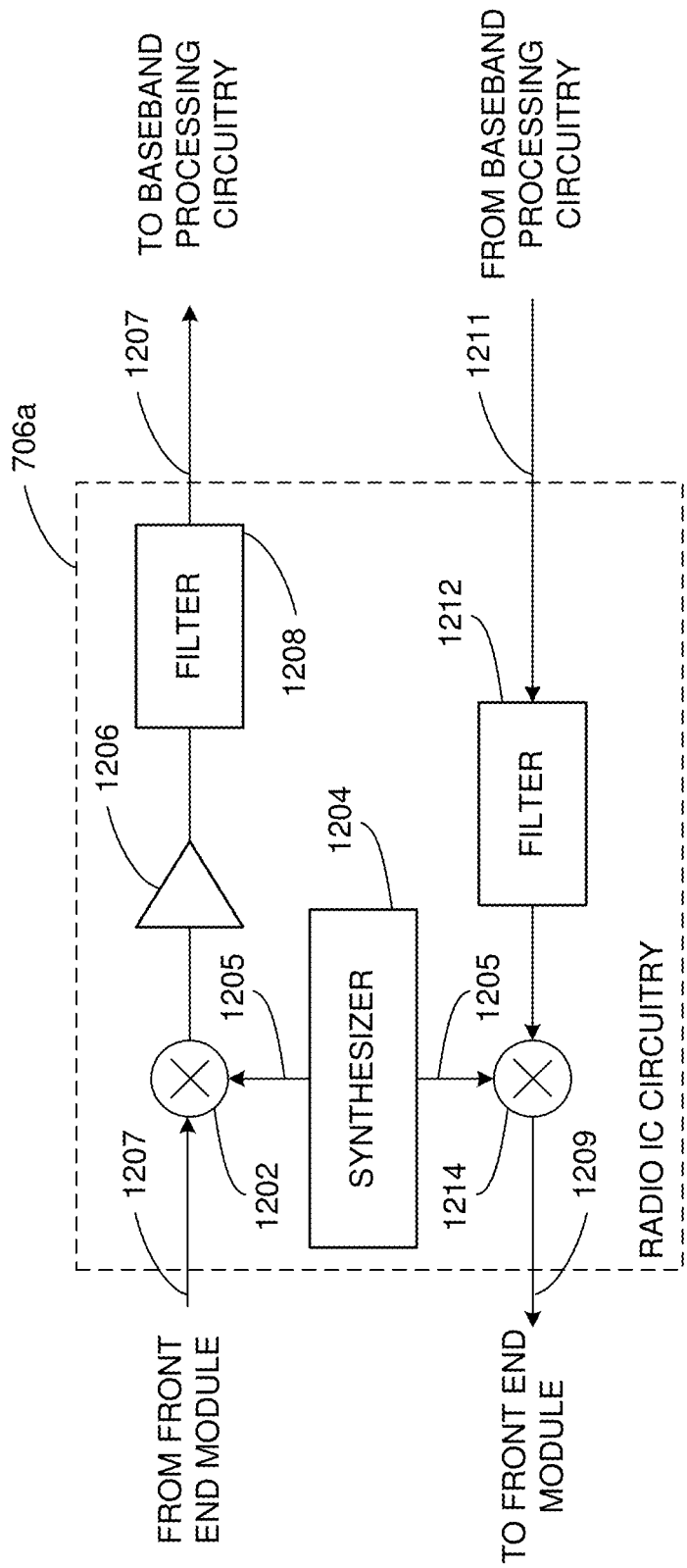
FIG. 12 illustrates an example radio IC circuitry for use in the radio architecture of FIG. 10, in accordance with one or more example embodiments of the present disclosure.

FIG. 12 illustrates radio IC circuitry 1006a in accordance with some embodiments. The radio IC circuitry 1006a is one example of circuitry that may be suitable for use as the WLAN or BT radio IC circuitry 1006a/1006b (FIG. 10), although other circuitry configurations may also be suitable. Alternatively, the example of FIG. 12 may be described in conjunction with the example BT radio IC circuitry 1006b.

In some embodiments, the radio IC circuitry 1006a may include a receive signal path and a transmit signal path. The receive signal path of the radio IC circuitry 1006a may include at least mixer circuitry 1202, such as, for example, down-conversion mixer circuitry, amplifier circuitry 1206 and filter circuitry 1208. The transmit signal path of the radio IC circuitry 1006a may include at least filter circuitry 1212 and mixer circuitry 1214, such as, for example, up-conversion mixer circuitry. Radio IC circuitry 1006a may also include synthesizer circuitry 1204 for synthesizing a frequency 1205 for use by the mixer circuitry 1202 and the mixer circuitry 1214. The mixer circuitry 1202 and/or 1214 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 12 illustrates only a simplified version of a radio IC circuitry, and may include, although not shown, embodiments where each of the depicted circuitries may include more than one component. For instance, mixer circuitry 1214 may each include one or more mixers, and filter circuitries 1208 and/or 1212 may each include one or more filters, such as one or more BPFs and/or LPFs according to application needs. For example, when mixer circuitries are of the direct-conversion type, they may each include two or more mixers.

In some embodiments, mixer circuitry 1202 may be configured to down-convert RF signals 1107 received from the FEM circuitry 1004a-b (FIG. 10) based on the synthesized frequency 1205 provided by synthesizer circuitry 1204. The amplifier circuitry 1206 may be configured to amplify the down-converted signals and the filter circuitry 1208 may include an LPF configured to remove unwanted signals from the down-converted signals to generate output baseband signals 1207. Output baseband signals 1207 may be provided to the baseband processing circuitry 1008a-b (FIG. 10) for further processing. In some embodiments, the output baseband signals 1207 may be zero-frequency baseband signals, although this is not a requirement. In some embodiments, mixer circuitry 1202 may comprise passive mixers, although the scope of the embodiments is not limited in this respect.

In some embodiments, the mixer circuitry 1214 may be configured to up-convert input baseband signals 1211 based on the synthesized frequency 1205 provided by the synthesizer circuitry 1204 to generate RF output signals 1109 for the FEM circuitry 1004a-b. The baseband signals 1211 may be provided by the baseband processing circuitry 1008a-b and may be filtered by filter circuitry 1212. The filter circuitry 1212 may include an LPF or a BPF, although the scope of the embodiments is not limited in this respect.

In some embodiments, the mixer circuitry 1202 and the mixer circuitry 1214 may each include two or more mixers and may be arranged for quadrature down-conversion and/or up-conversion respectively with the help of synthesizer 1204. In some embodiments, the mixer circuitry 1202 and the mixer circuitry 1214 may each include two or more mixers each configured for image rejection (e.g., Hartley image rejection). In some embodiments, the mixer circuitry 1202 and the mixer circuitry 1214 may be arranged for direct down-conversion and/or direct up-conversion, respectively. In some embodiments, the mixer circuitry 1202 and the mixer circuitry 1214 may be configured for super-heterodyne operation, although this is not a requirement.

Mixer circuitry 1202 may comprise, according to one embodiment: quadrature passive mixers (e.g., for the in-phase (I) and quadrature phase (Q) paths). In such an embodiment, RF input signal 1107 from FIG. 12 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1205 of synthesizer 1204 (FIG. 12). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1107 (FIG. 11) may comprise a balanced signal, although the scope of the embodiments is not limited in this respect. The I and Q baseband output signals may be provided to low-noise amplifier, such as amplifier circuitry 1206 (FIG. 12) or to filter circuitry 1208 (FIG. 12).

In some embodiments, the output baseband signals 1207 and the input baseband signals 1211 may be analog baseband signals, although the scope of the embodiments is not limited in this respect. In some alternate embodiments, the output baseband signals 1207 and the input baseband signals 1211 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1204 may be a fractional-N synthesizer or a fractional N/N+1 synthesizer, although the scope of the embodiments is not limited in this respect as other types of frequency synthesizers may be suitable. For example, synthesizer circuitry 1204 may be a delta-sigma synthesizer, a frequency multiplier, or a synthesizer comprising a phase-locked loop with a frequency divider. According to some embodiments, the synthesizer circuitry 1204 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 1204 may be provided by a voltage controlled oscillator (VCO), although that is not a requirement. A divider control input may further be provided by either the baseband processing circuitry 1008a-b (FIG. 10) depending on the desired output frequency 1205. In some embodiments, a divider control input (e.g., N) may be determined from a look-up table (e.g., within a Wi-Fi card) based on a channel number and a channel center frequency as determined or indicated by the example application processor 1010. The application processor 1010 may include, or otherwise be connected to, one of the example secure signal converter 101 or the example received signal converter 103 (e.g., depending on which device the example radio architecture is implemented in).

In some embodiments, synthesizer circuitry 1204 may be configured to generate a carrier frequency as the output frequency 1205, while in other embodiments, the output frequency 1205 may be a fraction of the carrier frequency (e.g., one-half the carrier frequency, one-third the carrier frequency). In some embodiments, the output frequency 1205 may be a LO frequency (fLO).

Figure 13:
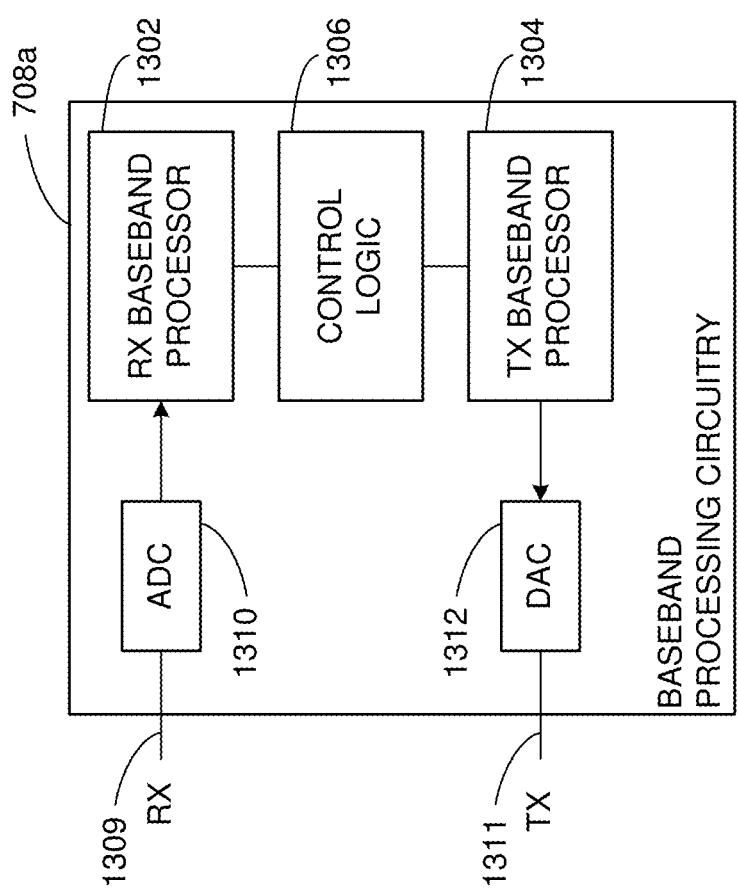
FIG. 13 illustrates an example baseband processing circuitry for use in the radio architecture of FIG. 10, in accordance with one or more example embodiments of the present disclosure.

FIG. 13 illustrates a functional block diagram of baseband processing circuitry 1008a in accordance with some embodiments. The baseband processing circuitry 1008a is one example of circuitry that may be suitable for use as the baseband processing circuitry 1008a (FIG. 10), although other circuitry configurations may also be suitable. Alternatively, the example of FIG. 12 may be used to implement the example BT baseband processing circuitry 1008b of FIG. 10.

The baseband processing circuitry 1008a may include a receive baseband processor (RX BBP) 1302 for processing receive baseband signals 1209 provided by the radio IC circuitry 1006a-b (FIG. 10) and a transmit baseband processor (TX BBP) 1304 for generating transmit baseband signals 1211 for the radio IC circuitry 1006a-b. The baseband processing circuitry 1008a may also include control logic 1306 for coordinating the operations of the baseband processing circuitry 1008a.

In some embodiments (e.g., when analog baseband signals are exchanged between the baseband processing circuitry 1008a-b and the radio IC circuitry 1006a-b), the baseband processing circuitry 1008a may include ADC 1310 to convert analog baseband signals 1309 received from the radio IC circuitry 1006a-b to digital baseband signals for processing by the RX BBP 1302. In these embodiments, the baseband processing circuitry 1008a may also include DAC 1312 to convert digital baseband signals from the TX BBP 1304 to analog baseband signals 1311.

In some embodiments that communicate OFDM signals or OFDMA signals, such as through baseband processor 1008a, the transmit baseband processor 1304 may be configured to generate OFDM or OFDMA signals as appropriate for transmission by performing an inverse fast Fourier transform (IFFT). The receive baseband processor 1302 may be configured to process received OFDM signals or OFDMA signals by performing an FFT. In some embodiments, the receive baseband processor 1302 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 10, in some embodiments, the antennas 1001 (FIG. 10) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1001 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A multi-link device (MLD), the MLD comprising processing circuitry coupled to storage, the processing circuitry configured to:
   establish a first communication link between a first access point (AP) device of the MLD and a first station device of a second MLD;
   establish a second communication link between a second AP device of the MLD and a second station device of the second MLD, wherein the first communication link and the second communication link concurrently are active;
   generate data to be sent using the first communication link and using the second communication link;
   code, for the first communication link, the data to generate a first group-addressed message using one of:
      a first encryption protocol and a first group temporal key (GTK),
      a first integrity protocol and a first integrity group temporal key (IGTK), or
      a second integrity protocol and a first beacon integrity group temporal key (BIGTK);
   code, for the second communication link, the data to generate a second group-addressed message using one of:
      the first encryption protocol and a second GTK,
      the first integrity protocol and a second IGTK,
      the second integrity protocol and a second beacon integrity group temporal key (BIGTK), wherein the second GTK, IGTK, or BIGTK is different than the first GTK, IGTK, or BIGTK;
   cause to send, using the first communication link, the first group-addressed message coded using the first encryption protocol, the first integrity protocol and the first IGTK, or the second integrity protocol and the first BIGTK; and
   cause to send, using the second communication link while the first communication link is active, the second group-addressed message coded using the first encryption protocol and the second GTK, the first integrity protocol and the second IGTK, or the second integrity protocol and the second BIGTK.

2. The MLD of claim 1, wherein the first GTK, IGTK, or BIGTK and the second GTK, IGTK, or BIGTK are delivered from the MLD to the second MLD using a one four-way handshake or a group key handshake.

3. The MLD of claim 1, wherein:
the first GTK, IGTK, or BIGTK is included in a first multi-link key data encapsulation (KDE),
a first link identifier identifying the first communication link is included in the first multi-link KDE,
the second GTK, IGTK, or BIGTK is included in a second multi-link KDE, and
a second link identifier identifying the second communication link is included in the second multi-link KDE.

4. The MLD of claim 3, wherein the first multi-link KDE includes a key identifier field, a transmitter field, and GTK fields associated with delivering the first GTK, wherein the first multi-link KDE includes the key identifier field, an integrity packet number, and IGTK fields associated with delivering the first IGTK, or wherein the multi-link KDE includes the key identifier field, a beacon integrity packet number, and BIGTK fields associated with delivering the first BIGTK.

5. The MLD of claim 1, wherein the first group-addressed message sent using the first communication link is coded using the first encryption protocol, the first GTK, and a cipher suite, wherein the second group-addressed sent using the second communication link is coded using the first encryption protocol, the second GTK, and the cipher suite.

6. The MLD of claim 1, wherein the first group-addressed message sent using the first communication link is coded using the first encryption protocol, the first GTK, and a first cipher suite, wherein the second group-addressed sent using the second communication link is coded using the first encryption protocol, the second GTK, and a second cipher suite different than the first cipher suite.

7. The MLD of claim 1, wherein the first group-addressed message sent using the first communication link is coded using the first integrity protocol, the first IGTK, and a first cipher suite, wherein the second group-addressed sent using the second communication link is coded using the second encryption protocol, the second IGTK, and a second cipher suite different than the first cipher suite.

8. The MLD of claim 1, wherein a first medium access control (MAC) address of the first AP device of the MLD is different than a second MAC address of the second AP device of the MLD.

9. The MLD of claim 1, further comprising a transceiver configured to transmit and receive wireless signals comprising the first group-addressed message and the second group-addressed message.

10. The MLD of claim 9, further comprising an antenna coupled to the transceiver to cause to send the first group-addressed message using the first communication link.

11. A non-transitory computer-readable medium storing computer-executable instructions which when executed by one or more processors result in performing operations comprising:
establishing a first communication link between a first access point (AP) device of a multi-link device (MLD) and a first station device of a second MLD;
establishing a second communication link between a second AP device of the MLD and a second device of the second MLD, wherein the first communication link and the second communication link concurrently are active;
generating data to be sent using the first communication link and using the second communication link;
coding, for the first communication link, the data to generate a first group-addressed message using one of:
a first encryption protocol and a first group temporal key (GTK),
a first integrity protocol and a first integrity group temporal key (IGTK), or
a second integrity protocol and a first beacon integrity group temporal key (BIGTK);
coding, for the second communication link, the data to generate a second group-addressed message using one of:
the first encryption protocol and a second GTK,
the first integrity protocol and a second IGTK,
the second integrity protocol and a second beacon integrity group temporal key (BIGTK), wherein the second GTK, IGTK, or BIGTK is different than the first GTK, IGTK, or BIGTK;
causing to send, using the first communication link, the first group-addressed message coded using the first encryption protocol, the first integrity protocol and the first IGTK, or the second integrity protocol and the first BIGTK; and
causing to send, using the second communication link while the first communication link is active, the second group-addressed message coded using the first encryption protocol and the second GTK, the first integrity protocol and the second IGTK, or the second integrity protocol and the second BIGTK.

12. The non-transitory computer-readable medium of claim 11, wherein the first GTK, IGTK, or BIGTK and the second GTK, IGTK, or BIGTK are delivered from the MLD and to the second MLD using a one four-way handshake or a group key handshake.

13. The non-transitory computer-readable medium of claim 11, wherein:
the first GTK, IGTK, or BIGTK is included in a first multi-link key data encapsulation (KDE),
a first link identifier identifying the first communication link is included in the first multi-link KDE,
the second GTK, IGTK, or BIGTK is included in a second multi-link KDE, and
a second link identifier identifying the second communication link is included in the second multi-link KDE.

14. The non-transitory computer-readable medium of claim 13, wherein the first multi-link KDE includes a key identifier field, a transmitter field, and GTK fields associated with delivering the first GTK, wherein the first multi-link KDE includes the key identifier field, an integrity packet number, and IGTK fields associated with delivering the first IGTK, or wherein the multi-link KDE includes the key identifier field, a beacon integrity packet number, and BIGTK fields associated with delivering the first BIGTK.

15. The non-transitory computer-readable medium of claim 11, wherein the first group-addressed message sent using the first communication link is coded using the first encryption protocol, the first GTK, and a cipher suite, wherein the second group-addressed sent using the second communication link is coded using the first encryption protocol, the second GTK, and the cipher suite.

16. A method of securing communications between multi-link devices (MLDs), the method comprising:
establishing a first communication link between a first access point (AP) device of a multi-link device (MLD) and a first station device of a second MLD;
establishing a second communication link between a second AP device of the MLD and a second station device of the second MLD, wherein the first communication link and the second communication link concurrently are active;
generating data to be sent using the first communication link and using the second communication link;
coding, for the first communication link, the data to generate a first group-addressed message using one of:
 a first encryption protocol and a first group temporal key (GTK),
 a first integrity protocol and a first integrity group temporal key (IGTK), or
 a second integrity protocol and a first beacon integrity group temporal key (BIGTK);
coding, for the second communication link, the data to generate a second group-addressed message using one of:
 the first encryption protocol and a second GTK,
 the first integrity protocol and a second IGTK,
 the second integrity protocol and a second beacon integrity group temporal key (BIGTK), wherein the second GTK, IGTK, or BIGTK is different than the first GTK, IGTK, or BIGTK;
causing to send, using the first communication link, the first group-addressed message coded using the first encryption protocol, the first integrity protocol and the first IGTK, or the second integrity protocol and the first BIGTK; and
causing to send, using the second communication link while the first communication link is active, the second group-addressed message coded using the first encryption protocol and the second GTK, the first integrity protocol and the second IGTK, or the second integrity protocol and the second BIGTK.

17. The method of claim 16, wherein the first GTK, IGTK, or BIGTK and the second GTK, IGTK, or BIGTK are delivered from the MLD and to the second MLD using a one four-way handshake or a group key handshake.

18. The method of claim 16, wherein:
the first GTK, IGTK, or BIGTK is included in a first multi-link key data encapsulation (KDE),
a first link identifier identifying the first communication link is included in the first multi-link KDE,
the second GTK, IGTK, or BIGTK is included in a second multi-link KDE, and
a second link identifier identifying the second communication link is included in the second multi-link KDE.

19. The method of claim 18, wherein the first multi-link KDE includes a key identifier field, a transmitter field, and GTK fields associated with delivering the first GTK, wherein the first multi-link KDE includes the key identifier field, an integrity packet number, and IGTK fields associated with delivering the first IGTK, or wherein the multi-link KDE includes the key identifier field, a beacon integrity packet number, and BIGTK fields associated with delivering the first BIGTK.

20. The method of claim 16, wherein the first group-addressed message sent using the first communication link is coded using the first encryption protocol, the first GTK, and a cipher suite, wherein the second group-addressed sent using the second communication link is coded using the first encryption protocol, the second GTK, and the cipher suite.

* * * * *